(12) United States Patent
Chen et al.

(10) Patent No.: US 8,705,182 B1
(45) Date of Patent: Apr. 22, 2014

(54) PHOTOGRAPHING LENS ASSEMBLY

(71) Applicant: Largan Precision Co., Ltd., Taichung (TW)

(72) Inventors: Chun-Shan Chen, Taichung (TW); Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/741,366

(22) Filed: Jan. 14, 2013

(30) Foreign Application Priority Data

Oct. 2, 2012 (TW) .............................. 101136386 A

(51) Int. Cl.
*G02B 3/02* (2006.01)
*G02B 9/60* (2006.01)
*G02B 13/00* (2006.01)

(52) U.S. Cl.
CPC ............... *G02B 13/0045* (2013.01); *G02B 3/02* (2013.01); *G02B 9/60* (2013.01)
USPC .......................................... 359/714; 359/764

(58) Field of Classification Search
CPC ........ G02B 13/0045; G02B 3/02; G02B 3/04; G02B 9/60
USPC .......................................... 359/714, 763, 764
See application file for complete search history.

(56) References Cited

U.S. PATENT DOCUMENTS 8,310,768 B2 * 11/2012 Lin et al. ....................... 359/714

\* cited by examiner

*Primary Examiner* — David N Spector
(74) *Attorney, Agent, or Firm* — CKC & Partners Co., Ltd.

(57) ABSTRACT

A photographing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element has negative refractive power. The third lens element has refractive power. The fourth lens element with positive refractive power has an object-side surface being concave at a paraxial region thereof and an image-side surface being convex at a paraxial region thereof. The fifth lens element with negative refractive power has an image-side surface being concave at a paraxial region thereof and being convex at a peripheral region thereof, wherein the fifth lens element is made of plastic material and has at least one surface being aspheric.

26 Claims, 18 Drawing Sheets

PHOTOGRAPHING LENS ASSEMBLY

RELATED APPLICATIONS

The application claims priority to Taiwan Application Serial Number 101136386, filed Oct. 2, 2012, which is herein incorporated by reference.

BACKGROUND

1. Technical Field

The present invention relates to a photographing lens assembly. More particularly, the present disclosure relates to a compact photographing lens assembly applicable to electronic products.

2. Description of Related Art

In recent years, with the popularity of mobile products with camera functionalities, the demand for miniaturizing an optical lens system is increasing. The sensor of a conventional photographing camera is typically a CCD (Charge-Coupled Device) or a CMOS (Complementary Metal-Oxide-Semiconductor) sensor. As advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure, such as U.S. Pat. No. 8,179,470. Due to the popularity of mobile products with high-end specifications, such as smart phones and PDAs (Personal Digital Assistants), the pixel and image-quality requirements of the compact optical lens system have increased rapidly. However, the conventional four-element lens structure cannot satisfy the requirements of the compact optical lens system.

Another conventional compact optical lens system has five-element lens structure, such as U.S. Pat. No. 8,000,031. Due to the insufficient distance between the fourth lens element and the fifth lens element, the lens elements are easily aslant or scrape, so that the manufacturing yield rate would be affected. Furthermore, the distance between the lens elements is insufficient for setting another element, such as a shutter, so that the image quality cannot be enhanced by the stray light.

SUMMARY

According to one aspect of the present disclosure, a photographing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element has negative refractive power. The third lens element has refractive power. The fourth lens element with positive refractive power has an object-side surface being concave at a paraxial region thereof and an image-side surface being convex at a paraxial region thereof. The fifth lens element with negative refractive power has an image-side surface being concave at a paraxial region thereof and being convex at peripheral region thereof, wherein the fifth lens element is made of plastic material and has at least one of an object-side surface and the image-side surface being aspheric. When an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, an axial distance between the first lens element and the second lens element is T12, and an axial distance between the second lens element and the third lens element is T23, the following relationships are satisfied:

$1.0 < T45/CT4 < 2.5$, $1.0 < T45/CT5 < 5.0$;

$-2.0 < f/R4 < 0.40$; and $0 < T12/T23 < 0.65$.

According to another aspect of the present disclosure, a photographing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element has negative refractive power. The third lens element has refractive power. The fourth lens element with positive refractive power has an object-side surface being concave at a paraxial region thereof and an image-side surface being convex at a paraxial region. The fifth lens element with negative refractive power has an image-side surface being concave at a paraxial region thereof and being convex at peripheral region thereof, wherein the fifth lens element is made of plastic material and has at least one of an object-side surface and the image-side surface being aspheric. When an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, a curvature radius of an object-side surface of the third lens element is R5, and a curvature radius of an image-side surface of the third lens element is R6, the following relationships are satisfied:

$1.0 < T45/CT4 < 2.5$;

$1.0 < T45/CT5 < 5.0$, $-2.0 < f/R4 < 0.40$; and $0 < |f/R5| + |f/R6| < 2.0$.

According to yet another aspect of the present disclosure, a photographing lens assembly includes, in order from an object side to an image side, a first lens element, a second lens element, a third lens element, a fourth lens element and a fifth lens element. The first lens element with positive refractive power has an object-side surface being convex at a paraxial region thereof. The second lens element has negative refractive power. The third lens element has refractive power. The fourth lens element with positive refractive power has an object-side surface being concave at a paraxial region thereof and an image-side surface being convex at a paraxial region thereof. The fifth lens element with negative refractive power has an image-side surface being concave at a paraxial region thereof and being convex at a peripheral region thereof, wherein the fifth lens element is made of plastic material and has at least one of an object-side surface and the image-side surface being aspheric. When an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, an axial distance between the third lens element and the fourth lens element is T34, and a central thickness of the third lens element is CT3, the following relationships are satisfied:

1.1<*T*45/*CT*4<2.5;

1.0<*T*45/*CT*5<5.0;

−2.0<*f*/*R*4<0.70; and 3.3<(*T*34+*T*45)/*CT*3<6.0.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
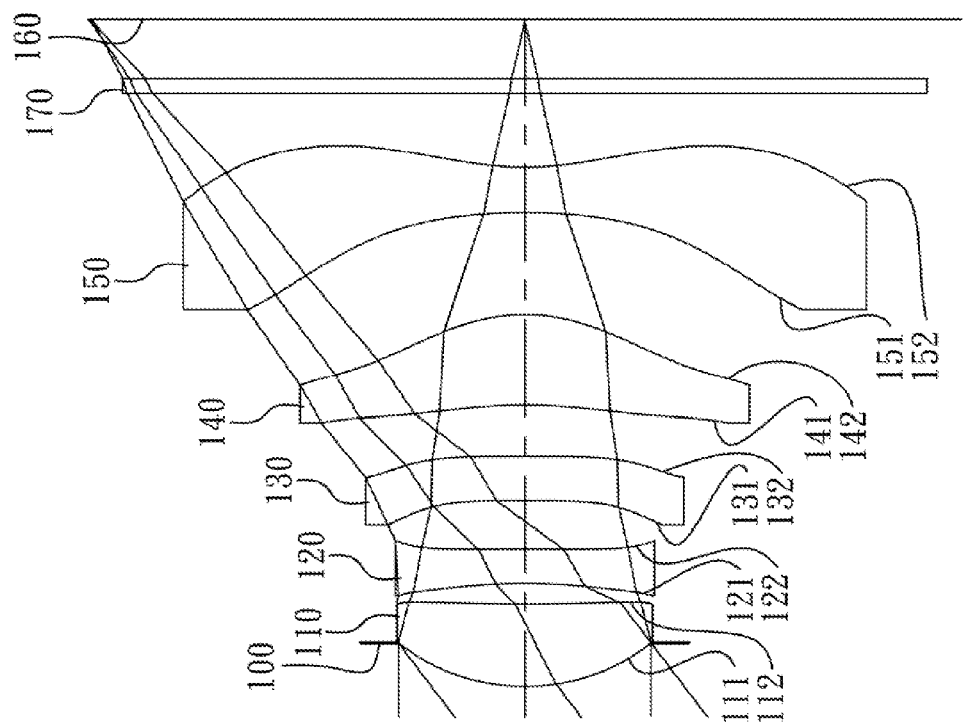
FIG. 1 is a schematic view of a photographing lens assembly according to the 1St embodiment of the present disclosure.

A photographing lens assembly includes, in order from an object side to an image side, a first lens element, a second lens element, a third lens element, a fourth lens element and a fifth lens element.

The first lens element with positive refractive power has an object-side surface being convex at a paraxial region thereof. Therefore, the total track length of the photographing lens assembly can be reduced by properly adjusting the positive refractive power of the first lens element.

The second lens element with negative refractive power can corrected the aberration generated from the first lens element with positive refractive power.

The third lens element can have an object-side surface being concave at a paraxial region thereof and an image-side surface being convex at a paraxial region thereof with negative refractive power, so that the high order aberration can be reduced and the astigmatism can be corrected.

The fourth lens element with positive refractive power has an object-side surface being concave at a paraxial region thereof and an image-side surface being convex at a paraxial region thereof. Therefore, the astigmatism can be corrected.

The fifth lens element with negative refractive power has an image-side surface being concave at a paraxial region thereof, and can have an object-side surface being concave at a paraxial region thereof, so that the principal point of the photographing lens assembly can be positioned away from the image plane, and the total track length of the photographing lens assembly can be reduced so as to keep the photographing lens assembly compact. The fifth lens element has the image-side surface being convex at a peripheral region thereof, so that the aberration of the off-axis field can be corrected through reducing the angle of incidence onto the image sensor from the off-axis field.

When an axial distance between the fourth lens element and the fifth lens element is T45, and a central thickness of the fourth lens element is CT4, the following relationship is satisfied:

1.0<*T*45/*CT*4<2.5.

Therefore, sufficient space between the fourth and fifth lens elements can improve the manufacture and the assembling of the lens elements and enable the utilization of a light-limiting element such as a stop to enhance the image quality.

T45 and CT4 can further satisfy the following relationship:

1.1*T*45/*CT*4<2.5.

Furthermore, T45 and CT4 can satisfy the following relationship:

1.0<*T*45/*CT*4<1.6.

When the axial distance between the fourth lens element and the fifth lens element is T45, and a central thickness of the fifth lens element is CT5, the following relationship is satisfied:

1.0<*T*45 1*CT*5<5.0.

Therefore, the manufacture and the assembling of the lens elements and the image quality can be enhanced.

When a focal length of the photographing lens assembly is f, and a curvature radius of the image-side surface of the second lens element is R4, the following relationship is satisfied:

$$-2.0 < f/R4 < 0.70.$$

Therefore, the aberration generated from the first n element can be corrected.

f and R4 can further satisfy the following relationship:

$$-2.0 < f/R4 < 0.40.$$

Furthermore, f and R4 can satisfy the following relationship:

$$-0.60 < f/R4 < 0.20.$$

When an axial distance between the first lens element and the second lens element is T12, and an axial distance between the second lens element and the third lens element is T23, the following relationship is satisfied:

$$0 < T12/T23 < 23\ 0.65.$$

Therefore, the manufacturing yield rate can be increased by the favorable assembling condition from the arrangement mentioned above.

When the focal length of the photographing lens assembly is f, and a focal length of the fourth lens element is f4, the following relationship is satisfied:

$$0.6 < f/f4 < 1.8.$$

When a curvature radius of the object-side surface of the first lens element is R1, and a curvature radius of an image-side surface of the first lens element is R2, the following relationship is satisfied:

$$-2.0 < (R1+R2)/(R1-R2) < -0.80.$$

Therefore, the total track length can be reduced by properly adjusting the curvature of the surfaces of the first lens element.

When the curvature radius of the object-side surface of the first lens element is R1, the curvature radius of the image-side surface of the first lens element is R2, a curvature radius of an object-side surface of the second lens element is R3, and the curvature radius of the image-side surface of the second lens element is R4, the following relationship is satisfied:

$$0 < (|R1 \times R4| + |R2 \times R3|)/|R2 \times R4| < 0.75.$$

Therefore, the aberration, the astigmatism and the spherical aberration can be corrected.

R2, R3 and R4 can further satisfy the following relationship:

$$0 < (|R1 \times R4| + |R2 \times R3|)/|R2 \times R4| < 0.5.$$

When an Abbe number of the second lens element is V2, and an Abbe number of the third lens element is V3, the following relationship is satisfied:

$$40 < V2 + V3 < 60.$$

Therefore, the chromatic aberration can be corrected.

When the axial distance between the fourth lens element and the fifth lens element is T45, the following relationship is satisfied:

$$0.50\ mm < T45 < 1.2\ mm.$$

By such arrangement, the distance between the fourth lens element and the fifth lens element is sufficient for avoiding the assembling tilt or damages on the surfaces of the lens elements. Furthermore, the light-limiting element can be allocated within the sufficient distance between the lens elements for reducing the stray light and enhancing the image quality.

When a curvature radius of an image-side surface of the third lens element is R6, and a focal length of the third lens element is f3, the following relationship is satisfied:

$$0 < R6/f3 < 2.5.$$

Therefore, the high order aberration and the astigmatism can be corrected.

When the focal length of the photographing lens assembly is f, a curvature radius of an object-side surface of the third lens element is R5, and the curvature radius of the image-side surface of the third lens element is R6, the following relationship is satisfied:

$$0 < |f/R5| + |f/R6| < 2.0.$$

Therefore, the high order aberration and the astigmatism can be corrected.

R5, R6 and f can further satisfy the following relationship:

$$0 < |f/R5| + |f/R6| < 1.0.$$

When an axial distance between the third lens element and the fourth lens element is T34, the axial distance between the fourth lens element and the fifth lens element is T45, and a central thickness of the third lens element is CT3, the following relationship is satisfied:

$$3.3 < (T34+T45)/CT3 < 6.0.$$

Therefore, the manufacture and the assembling of the lens elements are favorable for increasing the manufacture yield rate.

When a curvature radius of the object-side surface of the fifth lens element is R9, and a curvature radius of the image-side surface of the fifth lens element is R10, the following relationship is satisfied:

$$-0.5 < (R9+R10)/(R9-R10) < 0.5.$$

Therefore, the principal point of the photographing lens assembly can be positioned away from the image plane, and the total track length of the photographing lens assembly can be reduced so as to keep the photographing lens assembly compact.

According to the photographing lens assembly of the present disclosure, the lens elements thereof can be made of glass or plastic material. When the lens elements are made of glass material, the distribution of the refractive power of the photographing lens assembly may be more flexible to design. When the lens elements are made of plastic material, the manufacturing costs can be effectively reduced. Furthermore surfaces of each lens element can be aspheric, so that it is easier to make the surfaces into non-spherical shapes. As a result, more controllable variables are obtained, and the aberration as well as the number of required lens elements can be reduced while constructing an optical system. Therefore, the total track length of the photographing lens assembly can also be reduced.

According to the photographing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the paraxial region of the surface is convex; and when the lens element has a concave surface, it indicates that the paraxial region of the surface is concave.

According to the photographing lens assembly of the present disclosure, the photographing lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and the image plane is favorable for enlarging the field of view of the system and thereby provides a wider field of view for the same.

According to the photographing lens assembly of the present disclosure, it can be utilized for various imaging applications, such as three dimensions image capturing, digital camera, mobile device, digital panel etc.

According to the above description of the present disclosure, the following 1st 9th specific embodiments are provided for further explanation.

1st Embodiment

Figure 2:
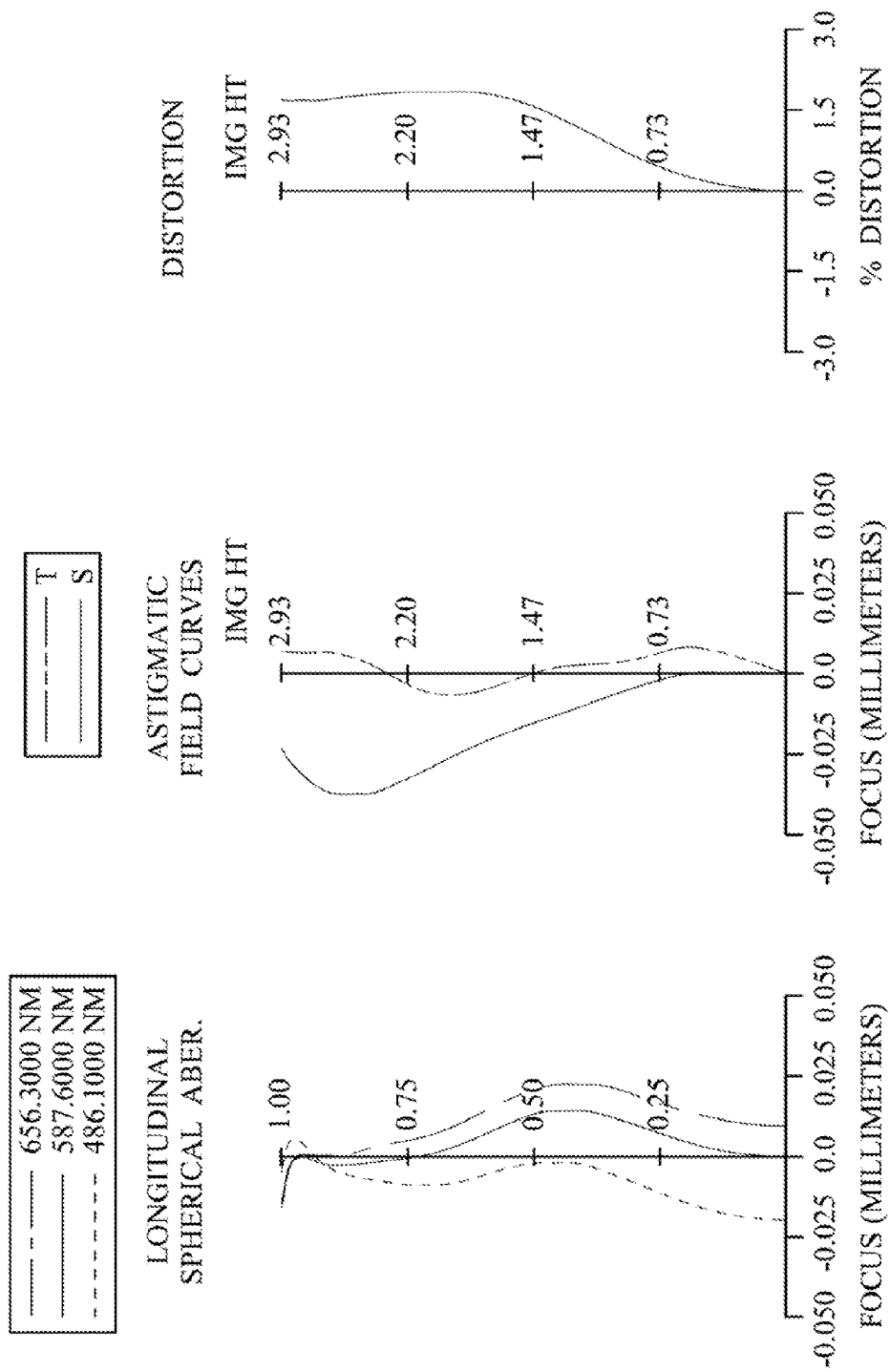
FIG. 2 shows spherical aberration curves, astigmatic field curves and a distortion curve of the photographing lens assembly according to the 1st embodiment.

FIG. 1 is a schematic view of a photographing lens assembly according to the 1st embodiment of the present disclosure. FIG. 2 shows spherical aberration curves, astigmatic field curves and a distortion curve of the photographing lens assembly according to the 1st embodiment. In FIG. 1, the photographing lens assembly includes, in order from an object side to an image side, a stop, which is an aperture stop 100, followed by a first lens element 110, a second lens element 120, a third lens element 130, a fourth lens element 140, a fifth lens element 150, an IR-cut filter 170 and an image plane 160.

The first lens element 110 with positive refractive power has an object-side surface 111 being convex at a paraxial region thereof and an image-side surface 112 being concave at a paraxial region thereof. The first lens element 110 is made of plastic material, and has the object-side surface 111 and the image-side surface 112 being both aspheric.

The second lens element 120 with negative refractive power has an object-side surface 121 being concave at a paraxial region thereof and an image-side surface 122 being convex at a paraxial region thereof. The second lens element 120 is made of plastic material and has the object-side surface 121 and the image-side surface 122 being both aspheric.

The third lens element 130 with negative refractive power has an object-side surface 131 being concave at a paraxial region thereof and an image-side surface 132 being convex at a paraxial region thereof. The third lens element 130 is made of plastic material, and has the object-side surface 131 and the image-side surface 132 being both aspheric.

The fourth lens element 140 with positive refractive power has an object-side surface 141 being concave at a paraxial region thereof and an image-side surface 142 being convex at a paraxial region thereof. The fourth lens element 140 is made of plastic material and has the object-side surface 141 and the image-side surface 142 being both aspheric.

The fifth lens element 150 with negative refractive power has an object-side surface 151 being concave at a paraxial region thereof, and has an image-side surface 152 being concave at a paraxial region thereof and being convex at a peripheral region thereof. The fifth lens element 150 is made of plastic material, and has the object-side surface 151 and the image-side surface 152 being both aspheric.

The IR-cut filter 170 is made of glass material and located between the fifth lens element 150 and the image plane 160, and will not affect the focal length of the photographing lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_{i}(Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the photographing lens assembly according to the 1st embodiment, when a focal length of the photographing lens assembly is f, an f-number of the photographing lens assembly is Fno, and half of the maximal field of view of the photographing lens assembly is HFOV these parameters have the following in values:

f=3.79 mm;

Fno=2.23; and

HFOV=37.3 degrees.

In the photographing lens assembly according to the 1st embodiment, when an Abbe number of the second lens element 120 is V2, and an Abbe number of the third lens element 130 is V3, the following relationship is satisfied:

$V2+V3=47.6$.

In the photographing lens assembly according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, a central thickness of the third lens element 130 is CT3, a central thickness of the fourth lens element 140 is CT4, a central thickness of the fifth lens element 150 is CT5, the following relationships are satisfied:

$T45=0.687$ mm;

$T12/T23=0.440$;

$T45/CT4=1.121$;

$T45/CT5=2.290$; and $(T34+T45)/CT3=3.396$.

In the photographing lens assembly according to the 1st embodiment, when a curvature radius of the object-side surface 111 of the first lens element 110 is R1, and a curvature radius of the image-side surface 112 of the first lens element 110 is R2, the following relationship is satisfied.

$(R1+R2)/(R1-R2)=-1.25$.

In the photographing lens assembly according to the 1st embodiment, when the focal length of the photographing lens assembly is f, and a curvature radius of the image-side surface 122 of the second lens element 120 is R4, the following relationship is satisfied:

$$f/R4=-0.04.$$

In the photographing lens assembly according to the 1st embodiment, when the curvature radius of the object-side surface 111 of the first lens element 110 is R1 the curvature radius of the image-side surface 112 of the first lens element 110 is R2, a curvature radius of the object-side surface 121 of the second lens element 120 is R3, and the curvature radius of the image-side surface 122 of the second lens element 120 is R4, the following relationship is satisfied:

$$(|R1 \times R4|+|R2 \times R3|)/|R2 \times R4|=0.15.$$

In the photographing lens assembly according to the 1st embodiment, when a curvature radius of the image-side surface 132 of the third lens element 130 is R6, and a focal length of the third lens element 130 is f3, the following relationship is satisfied:

$$R6/f3=0.18.$$

In the photographing lens assembly according to the 1st embodiment, when the focal length of the photographing lens assembly is f, a curvature radius of the object-side surface 131 of the third lens element 130 is R5, and the curvature radius of the image-side surface 132 of the third lens element 130 is R6, the following relationship is satisfied:

$$|f/R5|+|f/R6|=0.09.$$

In the photographing lens assembly according to the 1st embodiment, when a curvature radius of the object-side surface 151 of the fifth lens element 150 is R9, and a curvature radius of the image-side surface 152 of the fifth lens element 150 is R10, the following relationship is satisfied:

$$(R9+R10)/(R9-R10)=0.32.$$

In the photographing lens assembly according to the 1st embodiment, when the focal length of the photographing lens assembly is f, and a focal length of the fourth lens element 140 is f4, the following relationship is satisfied:

$$f/f4=1.28.$$

The detailed optical data of the 1st embodiment are shown in Table 1 and the aspheric surface data are shown in Table 2 below

TABLE 1

1st Embodiment
f = 3.79 mm, Fno = 2.23, HFOV = 37.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.292 | | | | |
| 2 | Lens 1 | 1.410 | ASP | 0.552 | Plastic | 1.514 | 56.8 | 3.04 |
| 3 | | 12.566 | ASP | 0.142 | | | | |
| 4 | Lens 2 | −4.076 | ASP | 0.230 | Plastic | 1.634 | 23.8 | −6.71 |
| 5 | | −100.000 | ASP | 0.323 | | | | |
| 6 | Lens 3 | −77.352 | ASP | 0.303 | Plastic | 1.634 | 23.8 | −541.51 |
| 7 | | −100.000 | ASP | 0.342 | | | | |
| 8 | Lens 4 | −3.310 | ASP | 0.613 | Plastic | 1.544 | 55.9 | 2.96 |
| 9 | | −1.155 | ASP | 0.687 | | | | |
| 10 | Lens 5 | −3.771 | ASP | 0.300 | Plastic | 1.514 | 56.8 | −2.44 |
| 11 | | 1.932 | ASP | 0.500 | | | | |
| 12 | IR-cut filter | Plano | | 0.100 | Glass | 1.517 | 64.2 | — |
| 13 | | Plano | | 0.399 | | | | |
| 14 | Image | Plano | | — | | | | |

Note:
Reference wavelength (d-line) is 587.6 nm.

TABLE 2

Aspheric Coefficients

| Surface # | 2 | 3 | 4 | 5 | 6 |
|---|---|---|---|---|---|
| k = | −2.7552E+00 | 1.0000E+01 | −3.5518E+01 | −1.0000E+02 | −1.0000E+02 |
| A4 = | 1.3312E−01 | −2.8178E−02 | −7.2207E−02 | −2.8038E−03 | −2.6825E−01 |
| A6 = | −3.5671E−02 | −8.4321E−03 | 1.5394E−01 | 1.8291E−01 | 6.5862E−02 |
| A8 = | 2.1200E−01 | 1.7793E−01 | 1.9414E−01 | −1.3820E−01 | −2.8842E−01 |
| A10 = | −5.8564E−01 | −5.2385E−01 | −9.7630E−01 | 3.0872E−01 | 4.6845E−01 |
| A12 = | 8.2904E−01 | 7.7281E−01 | 1.3679E+00 | −5.2045E−01 | −1.6157E−01 |
| A14 = | −4.4393E−01 | −6.1975E−01 | −8.6106E−01 | 3.5692E−01 | |

| Surface # | 7 | 8 | 9 | 10 | 11 |
|---|---|---|---|---|---|
| k = | −1.0000E+00 | 8.4362E−01 | −3.7140E+00 | 8.5677E−01 | −1.0262E+01 |
| A4 = | −1.3466E−01 | 8.7540E−02 | −8.6604E−02 | −1.9025E−02 | −5.9607E−02 |
| A6 = | −2.2107E−02 | 5.1561E−02 | 1.3712E−01 | −2.8790E−02 | 1.5689E−02 |
| A8 = | −3.0451E−02 | −1.3247E−01 | −6.7248E−02 | 2.0568E−02 | −4.5321E−03 |
| A10 = | 6.6305E−02 | 1.0763E−01 | 2.1198E−02 | −5.2975E−03 | 1.0067E−03 |
| A12 = | −2.0020E−03 | −4.2127E−02 | −5.7774E−03 | 7.0915E−04 | −1.3937E−04 |
| A14 = | | 6.3337E−03 | 7.9295E−04 | −4.0714E−05 | 8.3992E−06 |

In Table 1 the curvature radius, the thickness and the focal length are shown in millimeters). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
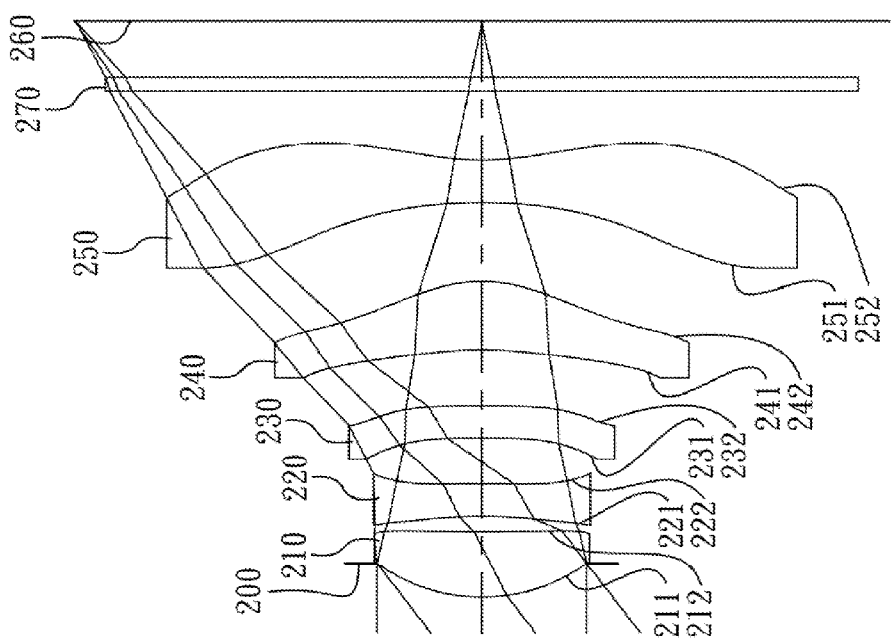
FIG. 3 is a schematic view of a photographing lens assembly according to the 2nd embodiment of the present disclosure.
Figure 4:
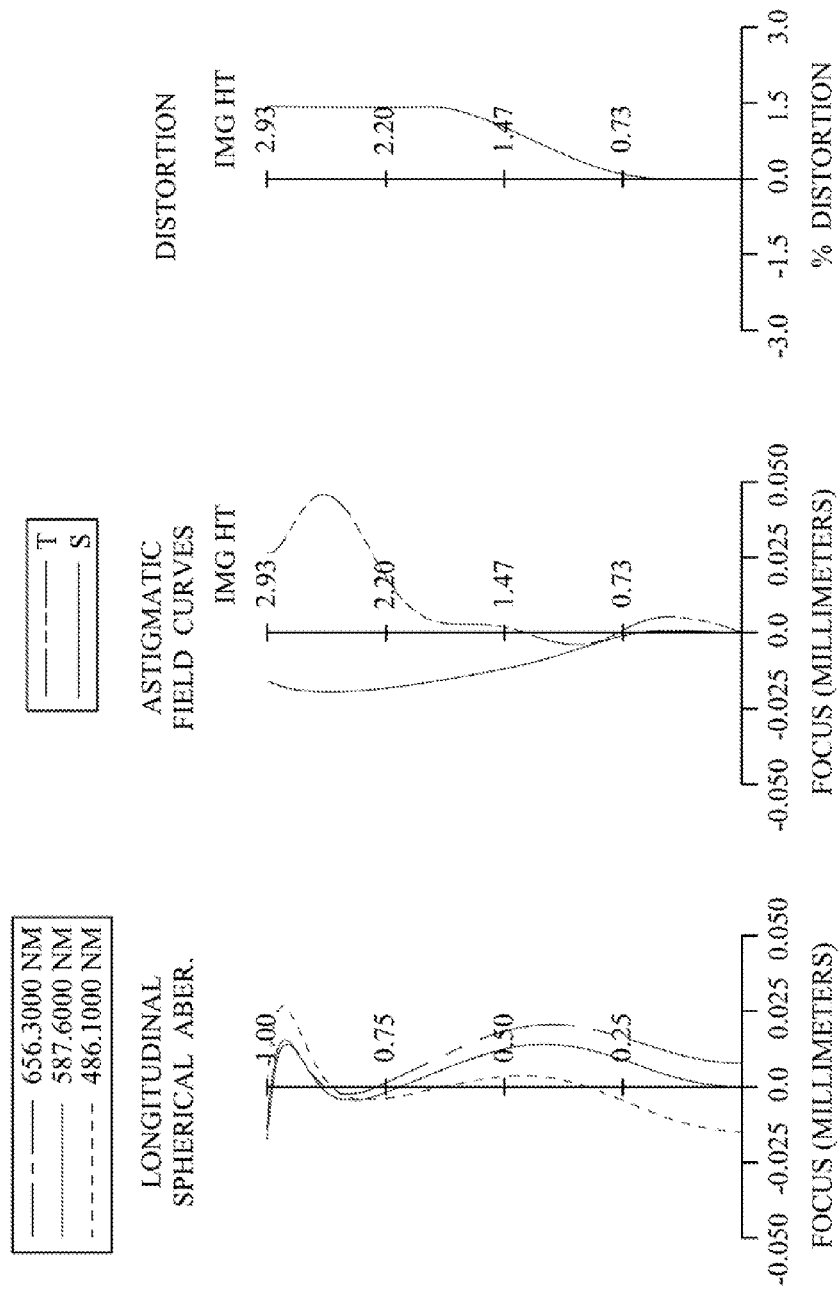
FIG. 4 shows spherical aberration curves, astigmatic field curves and a distortion curve of the photographing lens assembly according to the 2nd embodiment.

FIG. 3 is a schematic view of a photographing lens assembly according to the 2nd embodiment of the present disclosure. FIG. 4 shows spherical aberration curves, astigmatic field curves and a distortion curve of the photographing lens assembly according to the 2nd embodiment. In FIG. 3, the photographing lens assembly includes, in order from an object side to an image side, a stop, which is an aperture stop 200, followed by a first lens element 210, a second lens element 220, a third lens element 230, a fourth lens element 240, a fifth lens element 250, an IR-cut filter 270 and an image plane 260.

The first lens element 210 with positive refractive power has an object-side surface 211 being convex at a paraxial region thereof and an image-side surface 212 being concave at a paraxial region thereof. The first lens element 210 is made of plastic material, and has the object-side surface 211 and the image-side surface 212 being both aspheric.

The second lens element 220 with negative refractive power has an object-side surface 221 being concave at a paraxial region thereof and an image-side surface 222 being convex at a paraxial region thereof. The second lens element 220 is made of plastic material, and has the object-side surface 221 and the image-side surface 222 being both aspheric.

The third lens element 230 with negative refractive power has an object-side surface 231 being concave at a paraxial region thereof and an image-side surface 232 being convex at a paraxial region thereof. The third lens element 230 is made of plastic material, and has the object-side surface 231 and the image-side surface 232 being both aspheric.

The fourth lens element 240 with positive refractive power has an object-side surface 241 being concave at a paraxial region thereof and an image-side surface 242 being convex at a paraxial region thereof. The fourth lens element 240 is made of plastic material and has the object-side surface 241 and the image-side surface 242 being both aspheric.

The fifth lens element 250 with negative refractive power has an object-side surface 251 being concave at a paraxial region thereof, and has an image-side surface 252 being concave at a paraxial region thereof and being convex at a peripheral region thereof. The fifth lens element 250 is made of plastic material, and has the object-side surface 251 and the image-side surface 252 being both aspheric.

The IR-cut filter 270 is made of glass material and located between the fifth lens element 250 and the image plane 260, and will not affect the focal length of the photographing lens assembly.

The detailed optical data of the 2nd embodiment are shown in Table 3 and the aspheric surface data are shown in Table 4 below.

TABLE 3

2nd Embodiment
f = 3.70 mm, Fno = 2.45, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.242 | | | | |
| 2 | Lens 1 | 1.283 | ASP | 0.475 | Plastic | 1.544 | 55.9 | 2.59 |
| 3 | | 12.324 | ASP | 0.111 | | | | |
| 4 | Lens 2 | −3.441 | ASP | 0.230 | Plastic | 1.634 | 23.8 | −5.63 |
| 5 | | −100.000 | ASP | 0.333 | | | | |
| 6 | Lens 3 | −22.995 | ASP | 0.232 | Plastic | 1.634 | 23.8 | −47.15 |
| 7 | | −100.000 | ASP | 0.403 | | | | |
| 8 | Lens 4 | −2.810 | ASP | 0.493 | Plastic | 1.544 | 55.9 | 2.76 |
| 9 | | −1.040 | ASP | 0.572 | | | | |
| 10 | Lens 5 | −3.530 | ASP | 0.301 | Plastic | 1.544 | 55.9 | −2.14 |
| 11 | | 1.793 | ASP | 0.500 | | | | |
| 12 | IR-cut filter | Plano | | 0.100 | Glass | 1.517 | 64.2 | — |
| 13 | | Plano | | 0.407 | | | | |
| 14 | Image | Plano | | — | | | | |

Note:
Reference wavelength (d-line) is 587.6 nm.

TABLE 4

Aspheric Coefficients

| Surface # | 2 | 3 | 4 | 5 | 6 |
|---|---|---|---|---|---|
| k = | −3.2990E+00 | −3.5613E+01 | −1.6888E+01 | −1.0000E+00 | −3.8513E+01 |
| A4 = | 1.9167E−01 | −7.7434E−02 | −3.6250E−02 | 7.3941E−02 | −3.7289E−01 |
| A6 = | −2.3617E−02 | 9.8107E−02 | 3.2641E−01 | 3.3564E−01 | 6.2072E−02 |
| A8 = | 6.2815E−02 | −6.2197E−02 | 5.6063E−02 | −1.0729E−01 | −3.4688E−01 |
| A10 = | −5.5529E−01 | −1.6777E−01 | −1.5516E+00 | −3.2506E−01 | 1.2658E+00 |
| A12 = | 1.4962E+00 | 2.3097E−01 | 2.1201E+00 | 8.5437E−01 | −9.0578E−01 |

TABLE 4-continued

| Aspheric Coefficients | | | | |
|---|---|---|---|---|
| A14 = | −1.3870E+00 | −7.3215E−01 | −1.2227E+00 | 4.2153E−01 |

| Surface # | 7 | 8 | 9 | 10 | 11 |
|---|---|---|---|---|---|
| k = | −1.0000E+00 | −2.3649E+01 | −3.8964E+00 | −1.1325E+01 | −1.4317E+01 |
| A4 = | −2.4565E−01 | 3.4982E−02 | −4.5369E−02 | −3.2298E−02 | −6.7334E−02 |
| A6 = | −1.0178E−01 | 9.5021E−03 | 1.6565E−01 | −2.6345E−02 | 2.1157E−02 |
| A8 = | 1.3905E−01 | −1.1602E−01 | −1.1040E−01 | 2.5507E−02 | −6.5817E−03 |
| A10 = | 1.0444E−01 | 1.3496E−01 | 3.2706E−02 | −7.4164E−03 | 1.3619E−03 |
| A12 = | −2.9249E−02 | −6.6723E−02 | −4.6749E−03 | 9.5823E−04 | −1.6606E−04 |
| A14 = | | 1.1586E−02 | 1.3203E−04 | −4.6811E−05 | 9.6192E−06 |

In the photographing lens assembly according to the 2nd embodiment, the definitions of the following parameters are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.70 | (T34 + T45)/CT3 | 4.203 |
| Fno | 2.45 | (R1 + R2)/(R1 − R2) | −1.23 |
| HFOV (deg.) | 38.0 | f/R4 | −0.04 |
| V2 + V3 | 47.6 | (\|R1 × R4\| + \|R2 × R3\|)/\|R2 × R4\| | 0.13 |
| T45 (mm) | 0.572 | R6/f3 | 2.12 |
| T12/T23 | 0.333 | \|f/R5\| + \|f/R6\| | 0.20 |
| T45/CT4 | 1.160 | (R9 + R10)/(R9 − R10) | 0.33 |
| T45/CT5 | 1.900 | f/f4 | 1.34 |

3rd Embodiment

Figure 5:
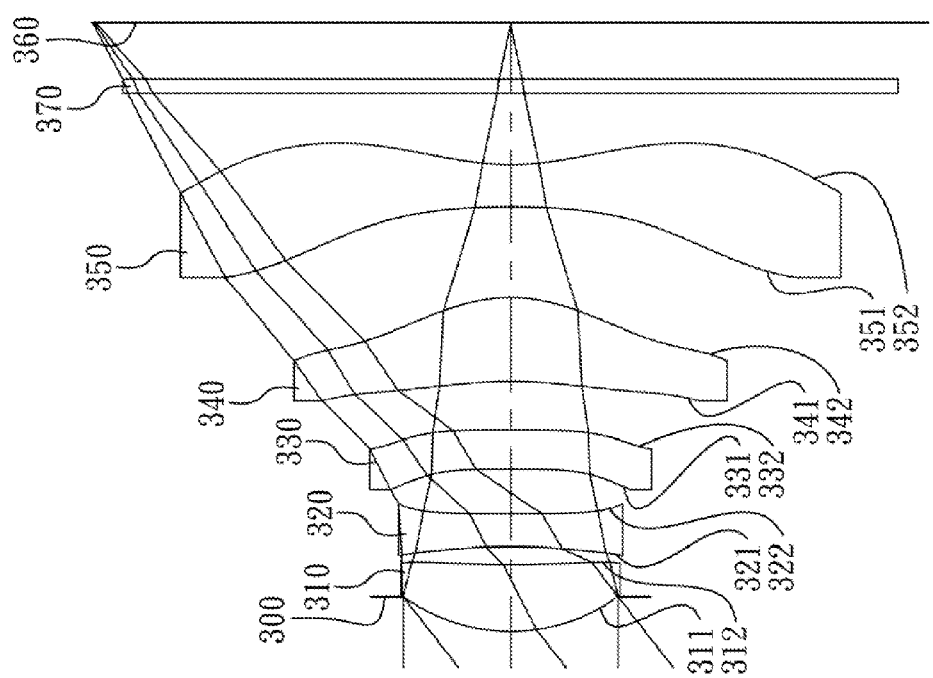
FIG. 5 is a schematic view of a photographing lens assembly according to the 3rd embodiment of the present disclosure.
Figure 6:
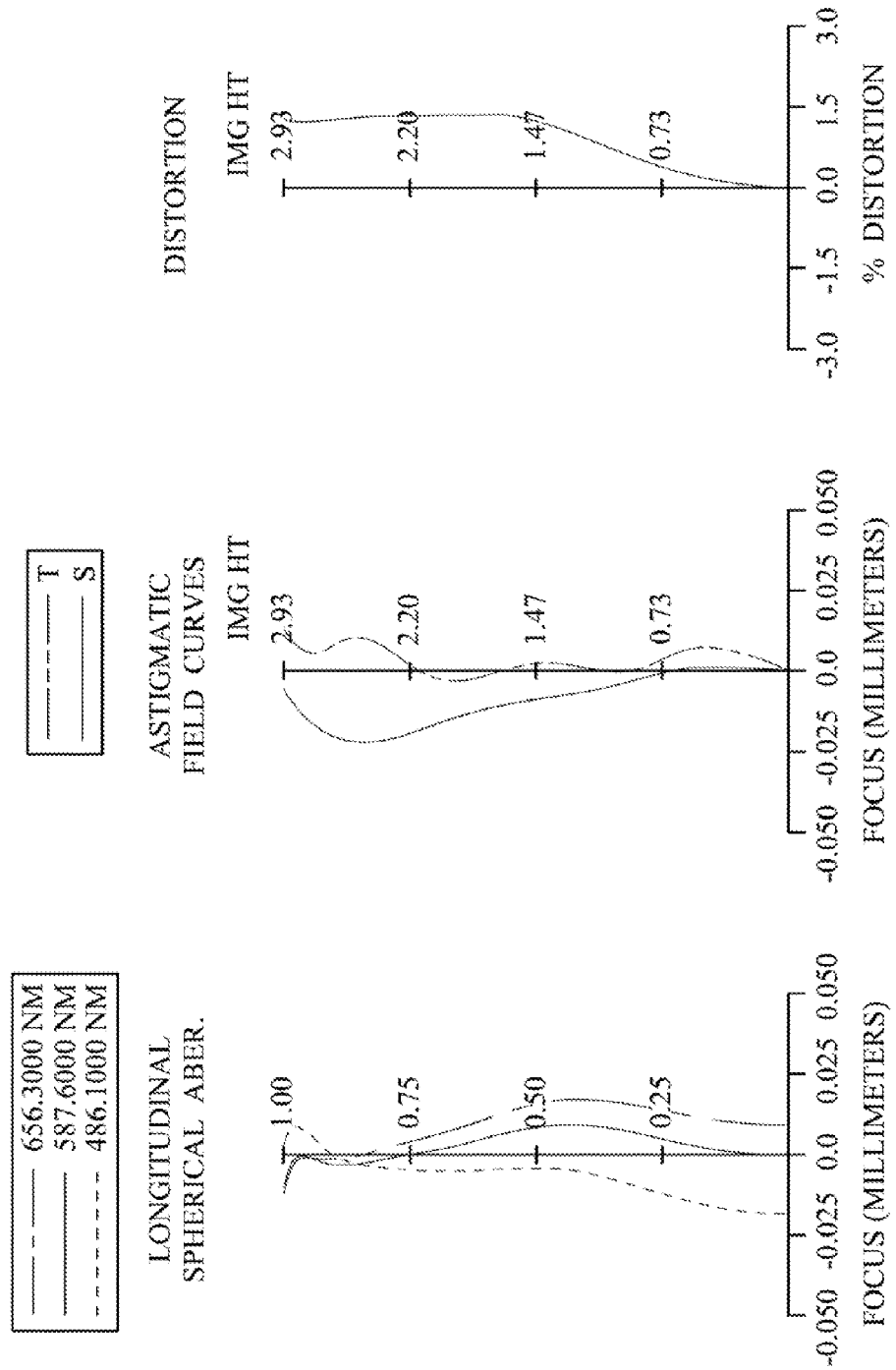
FIG. 6 shows spherical aberration curves, astigmatic field curves and a distortion curve of the photographing lens assembly according to the 3rd embodiment

FIG. 5 is a schematic view of a photographing lens assembly according to the 3rd embodiment of the present disclosure. FIG. 6 shows spherical aberration curves, astigmatic field curves and a distortion curve of the photographing lens assembly according to the 3rd embodiment. In FIG. 5, the photographing lens assembly includes, in order from an object side to an image side, a stop, which is an aperture stop 300, followed by a first lens element 310, a second lens element 320, a third lens element 330, a fourth lens element 340, a fifth lens element 350, an IR-cut filter 370 and an image plane 360.

The first lens element 310 with positive refractive power has an object-side surface 311 being convex at a paraxial region thereof and an image-side surface 312 being concave at a paraxial region thereof. The first lens element 310 is made of plastic material, and has the object-side surface 311 and the image-side surface 312 being both aspheric.

The second lens element 320 with negative refractive power has an object-side surface 321 being concave at a paraxial region thereof and an image-side surface 322 being concave at a paraxial region thereof. The second lens element 320 is made of plastic material, and has the object-side surface 321 and the image-side surface 322 being both aspheric.

The third lens element 330 with negative refractive power has an object-side surface 331 being concave at a paraxial region thereof and an image-side surface 332 being convex at a paraxial region thereof. The third lens element 330 is made of plastic material, and has the object-side surface 331 and the image-side surface 332 being both aspheric.

The fourth lens element 340 with positive refractive power has an object-side surface 341 being concave at a paraxial region thereof and an image-side surface 342 being convex at a paraxial region thereof. The fourth lens element 340 is made of plastic material and has the object-side surface 341 and the image-side surface 342 being both aspheric.

The fifth lens element 350 with negative refractive power has an object-side surface 351 being concave at a paraxial region thereof, and has an image-side surface 352 being concave at a paraxial region thereof and being convex at a peripheral region thereof. The fifth lens element 350 is made of plastic material, and has the object-side surface 351 and the mage-side surface 352 being both aspheric.

The IR-cut filter 370 is made of glass material and located between the fifth lens element 350 and the image plane 360, and will not affect the focal length of the photographing lens assembly.

The detailed optical data of the 3rd embodiment are shown in Table 5 and the aspheric surface data are shown in Table 6 below.

TABLE 5

3rd Embodiment
f = 3.71 mm, Fno = 2.45, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.243 | | | | |
| 2 | Lens 1 | 1.312 | ASP | 0.470 | Plastic | 1.544 | 55.9 | 2.85 |
| 3 | | 7.407 | ASP | 0.125 | | | | |
| 4 | Lens 2 | −5.262 | ASP | 0.230 | Plastic | 1.634 | 23.8 | −6.50 |
| 5 | | 19.326 | ASP | 0.319 | | | | |
| 6 | Lens 3 | −27.145 | ASP | 0.272 | Plastic | 1.634 | 23.8 | −58.85 |
| 7 | | −100.000 | ASP | 0.346 | | | | |
| 8 | Lens 4 | −3.030 | ASP | 0.588 | Plastic | 1.544 | 55.9 | 2.86 |
| 9 | | −1.099 | ASP | 0.639 | | | | |
| 10 | Lens 5 | −5.183 | ASP | 0.300 | Plastic | 1.544 | 55.9 | −2.34 |

TABLE 5-continued

3rd Embodiment
f = 3.71 mm, Fno = 2.45, HFOV = 38.0 deg.

| Surface # | | Curvature Radius | Thickness | Material | Index | Abbe # | Focal Length |
|---|---|---|---|---|---|---|---|
| 11 | | 1.724 ASP | 0.500 | | | | |
| 12 | IR-cut filter | Plano | 0.100 | Glass | 1.517 | 64.2 | — |
| 13 | | Plano | 0.402 | | | | |
| 14 | Image | Plano | — | | | | |

Note:
Reference wavelength (d-line) is 587.6 nm.

TABLE 6

Aspheric Coefficients

| Surface # | 2 | 3 | 4 | 5 | 6 |
|---|---|---|---|---|---|
| k = | −2.6067E+00 | −1.1503E+01 | −5.3766E+00 | −1.0000E+00 | −3.9378E+00 |
| A4 = | 1.5645E−01 | −7.5623E−02 | −9.9434E−02 | −4.5293E−02 | −3.5678E+00 |
| A6 = | −3.0297E−02 | 5.3000E−02 | 2.8467E−02 | 3.5757E−02 | 9.0065E+00 |
| A8 = | 2.5051E−01 | −1.5201E−02 | 2.1399E−01 | −2.1939E−02 | −3.0675E+00 |
| A10 = | −9.4487E−01 | −5.6580E−03 | −1.3504E+00 | −1.8296E−01 | 7.7763E+00 |
| A12 = | 1.7973E+00 | 1.5716E−01 | 1.8641E+00 | −1.0882E−01 | −3.7098E+00 |
| A14 = | −1.3142E+00 | −8.2152E−01 | −1.4560E+00 | 4.0229E−01 | |

| Surface # | 7 | 8 | 9 | 10 | 11 |
|---|---|---|---|---|---|
| k = | −1.0000E+00 | −2.8526E+00 | −3.8901E+00 | −6.8024E+00 | −9.5682E+00 |
| A4 = | −1.9678E−01 | 1.1610E−01 | −7.7354E−02 | −3.4333E−02 | −7.1546E−02 |
| A6 = | −3.2973E−02 | 1.8827E−03 | 1.8105E−01 | −2.7224E−02 | 2.1789E−02 |
| A8 = | 1.2104E−02 | −1.2839E−01 | −1.0531E−01 | 2.5570E−02 | −6.3015E−03 |
| A10 = | 1.0311E−01 | 1.3818E−01 | 3.0256E−02 | −7.3924E−03 | 1.3369E−03 |
| A12 = | −1.0997E−02 | −6.5485E−02 | −5.4698E−03 | 9.5702E−04 | −1.7065E−04 |
| A14 = | | 1.1544E−02 | 4.9037E−04 | −4.7091E−05 | 9.6086E−06 |

In the photographing lens assembly according to the 3rd embodiment, the definitions of the following parameters are the same as those stated in the 1st embodiment with corresponding values for the 3rd embodiment. Moreover, these parameters can be calculated from Table 5 and Table 6 as the following values and satisfy the following relationships:

| f (mm) | 3.71 | (T34 + T45)/CT3 | 3.621 |
|---|---|---|---|
| Fno | 2.45 | (R1 + R2)/(R1 − R2) | −1.43 |
| HFOV (deg.) | 38.0 | f/R4 | 0.19 |
| V2 + V3 | 47.6 | (|R1 × R4| + |R2 × R3|)/|R2 × R4| | 0.45 |
| T45 (mm) | 0.639 | R6/f3 | 1.70 |
| T12/T23 | 0.392 | |f/R5| + |f/R6| | 0.17 |
| T45/CT4 | 1.087 | (R9 + R10)/(R9 − R10) | 0.50 |
| T45/CT5 | 2.130 | f/f4 | 1.29 |

4th Embodiment

Figure 7:
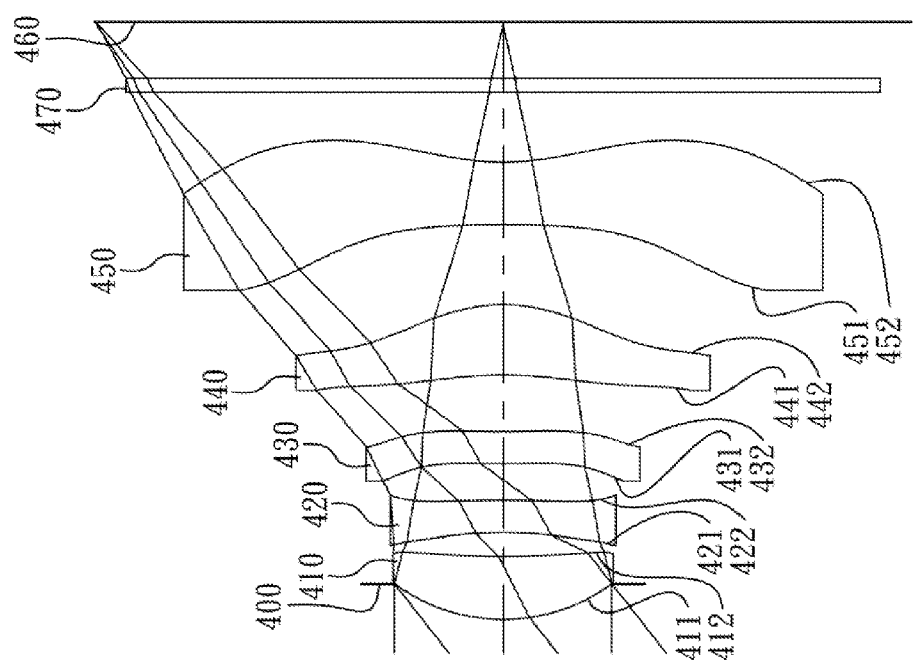
FIG. 7 is a schematic view of a photographing lens assembly according to the 4th embodiment of the present disclosure.
Figure 8:
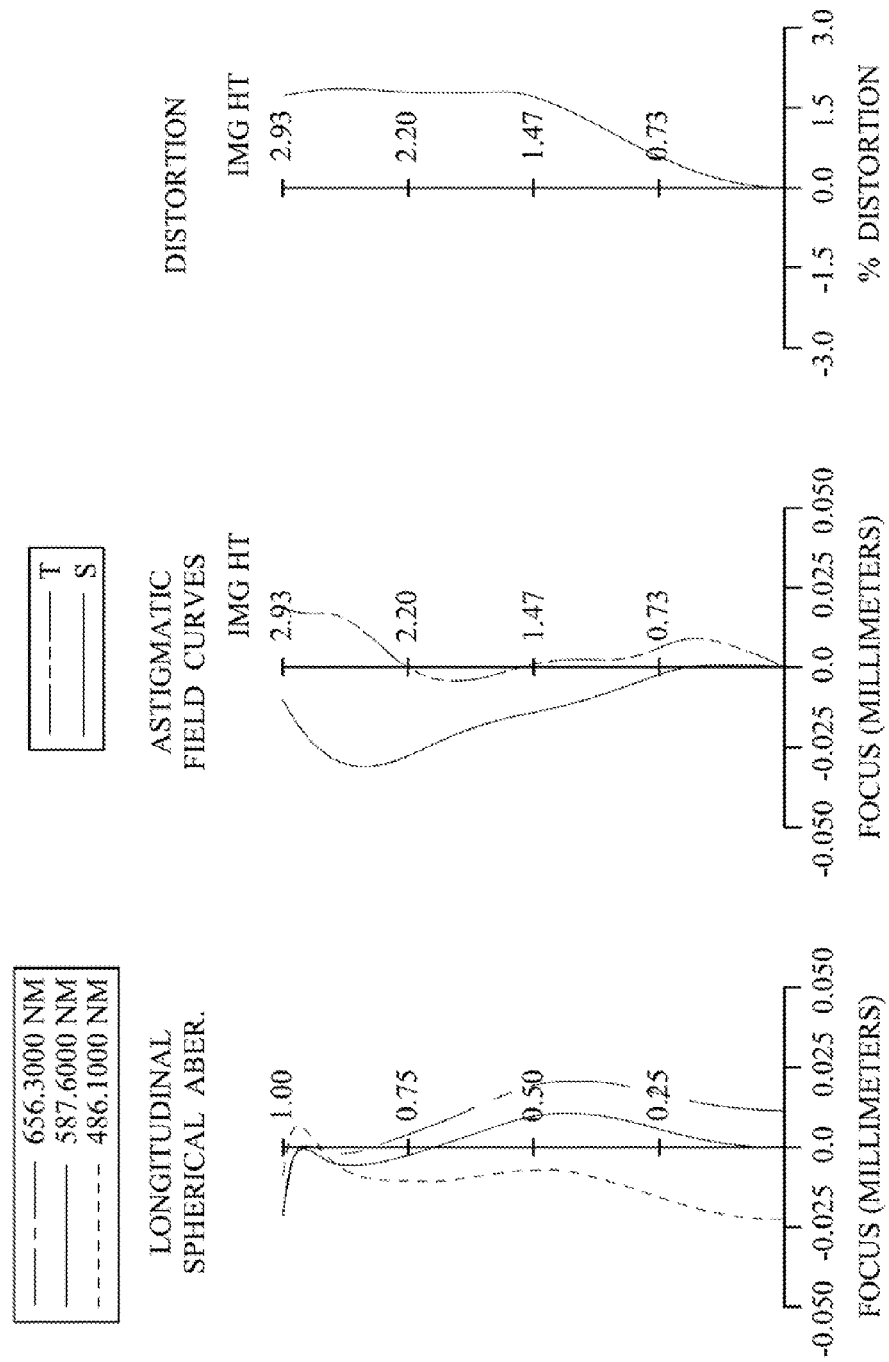
FIG. 8 shows spherical aberration curves, astigmatic field curves and a distortion curve of the photographing lens assembly according to the 4th embodiment.

FIG. 7 is a schematic view of a photographing lens assembly according to the 4th embodiment of the present disclosure. FIG. 8 shows spherical aberration curves, astigmatic field curves and a distortion curve of the photographing lens assembly according to the 4th embodiment. In FIG. 7, the photographing lens assembly includes, in order from an object side to an image side, a stop, which is an aperture stop 400, followed by a first lens element 410, a second lens element 420, a third lens element 430, a fourth lens element 440, a fifth lens element 450, an IR-cut filter 470 and an image plane 460.

The first lens element 410 with positive refractive power has an object-side surface 411 being convex at a paraxial region thereof and an image-side surface 412 being concave at a paraxial region thereof. The first lens element 410 is made of plastic material, and has the object-side surface 411 and the image-side surface 412 being both aspheric.

The second lens element 420 with negative refractive power has an object-side surface 421 being concave at a paraxial region thereof and an image-side surface 422 being convex at a paraxial region thereof. The second lens element 420 is made of plastic material, and has the object-side surface 421 and the image-side surface 422 being both aspheric.

The third lens element 430 with positive refractive power has an object-side surface 431 being convex at a paraxial region thereof and an image-side surface 432 being concave at a paraxial region thereof. The third lens element 430 is made of plastic material and has the object-side surface 431 and the image-side surface 432 being both aspheric.

The fourth lens element 440 with positive refractive power has an object-side surface 441 being concave at a paraxial region thereof and an image-side surface 442 being convex at a paraxial region thereof. The fourth lens element 440 is made of plastic material and has the object-side surface 441 and the image-side surface 442 being both aspheric.

The fifth lens element 450 with negative refractive power has an object-side surface 451 being concave at a paraxial region thereof, and has an image-side surface 452 being concave at a paraxial region thereof and being convex at a peripheral region thereof. The fifth lens element 450 is made of plastic material, and has the object-side surface 451 and the image-side surface 452 being both aspheric.

The IR-cut filter 470 is made of glass material and located between the fifth lens element 450 and the image plane 460, and will not affect the focal length of the photographing lens assembly.

The detailed optical data of the 4th embodiment are shown in Table 7 and the aspheric surface data are shown in Table 8 below.

TABLE 7

4th Embodiment
f = 3.67 mm, Fno = 2.35, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.254 | | | | |
| 2 | Lens 1 | 1.347 | ASP | 0.452 | Plastic | 1.566 | 54.2 | 2.98 |
| 3 | | 5.912 | ASP | 0.170 | | | | |
| 4 | Lens 2 | −2.985 | ASP | 0.230 | Plastic | 1.634 | 23.8 | −6.68 |
| 5 | | −10.408 | ASP | 0.265 | | | | |
| 6 | Lens 3 | 8.264 | ASP | 0.230 | Plastic | 1.634 | 23.8 | 122.88 |
| 7 | | 9.144 | ASP | 0.408 | | | | |
| 8 | Lens 4 | −2.732 | ASP | 0.502 | Plastic | 1.544 | 55.9 | 3.24 |
| 9 | | −1.141 | ASP | 0.577 | | | | |
| 10 | Lens 5 | −10.692 | ASP | 0.450 | Plastic | 1.544 | 55.9 | −2.71 |
| 11 | | 1.735 | ASP | 0.500 | | | | |
| 12 | IR-cut filter | Plano | | 0.100 | Glass | 1.517 | 64.2 | — |
| 13 | | Plano | | 0.407 | | | | |
| 14 | Image | Plano | | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | −2.8405E+00 | −1.1813E+01 | −1.8259E+01 | −5.0000E+01 | −1.0000E+00 |
| A4 = | 1.5897E−01 | −3.7589E−02 | −8.5526E−02 | −1.6134E−02 | −3.9335E−01 |
| A6 = | −3.2590E−02 | 3.2824E−02 | 2.4000E−01 | 3.1534E−01 | 1.1383E−01 |
| A8 = | 2.2238E−01 | −8.3991E−02 | 2.3376E−01 | −5.1244E−02 | −3.9955E−01 |
| A10 = | −8.1337E−01 | −2.8264E−02 | −1.4273E+00 | 3.1166E−02 | 7.7426E−01 |
| A12 = | 1.5204E+00 | 5.3399E−01 | 2.1743E+00 | −4.2223E−01 | −3.1609E−01 |
| A14 = | −1.0763E+00 | −1.0400E+00 | −1.6256E+00 | 5.2233E−01 | |

| Surface # | 7 | 8 | 9 | 10 | 11 |
|---|---|---|---|---|---|
| k = | −1.0000E+00 | −1.3628E+00 | −4.2021E+00 | −2.2709E+00 | −8.6249E+00 |
| A4 = | −2.2171E−01 | 1.4011E−01 | −9.0223E−02 | −6.4271E−02 | −7.0763E−02 |
| A6 = | −5.9431E−02 | 2.2157E−07 | 1.9485E−01 | −2.2463E−02 | 1.9344E−02 |
| A8 = | 3.9112E−02 | −1.5318E−01 | −1.0446E−01 | 2.6194E−02 | −5.6882E−03 |
| A10 = | 5.2691E−02 | 1.4492E−02 | 2.8295E−02 | −7.4418E−03 | 1.3225E−03 |
| A12 = | 2.5366E−02 | −6.2132E−02 | −5.6150E−03 | 9.2199E−04 | −1.8535E−04 |
| A14 = | | 1.0009E−02 | 6.7794E−04 | −4.2773E−05 | 1.1064E−05 |

In the photographing lens assembly according to the 4th embodiment, the definitions of the following parameters are the same as those stated in the 1st embodiment with corresponding values for the 4th embodiment. Moreover, these parameters can be calculated from Table 7 and Table 8 as the following values and satisfy the following relationships:

| f (mm) | 3.67 | (T34 + T45)/CT3 | 4.283 |
|---|---|---|---|
| Fno | 2.35 | (R1 + R2)/(R1 − R2) | −1.59 |
| HFOV (deg.) | 38.2 | f/R4 | −0.35 |
| V2 + V3 | 47.6 | (|R1 × R4| + |R2 × R3|)/|R2 × R4| | 0.52 |
| T45 (mm) | 0.577 | R6/f3 | 0.07 |
| T12/T23 | 0.642 | |f/R5| + |f/R6| | 0.85 |
| T45/CT4 | 1.149 | (R9 + R10)/(R9 − R10) | 0.72 |
| T45/CT5 | 1.282 | f/f4 | 1.13 |

5th Embodiment

Figure 9:
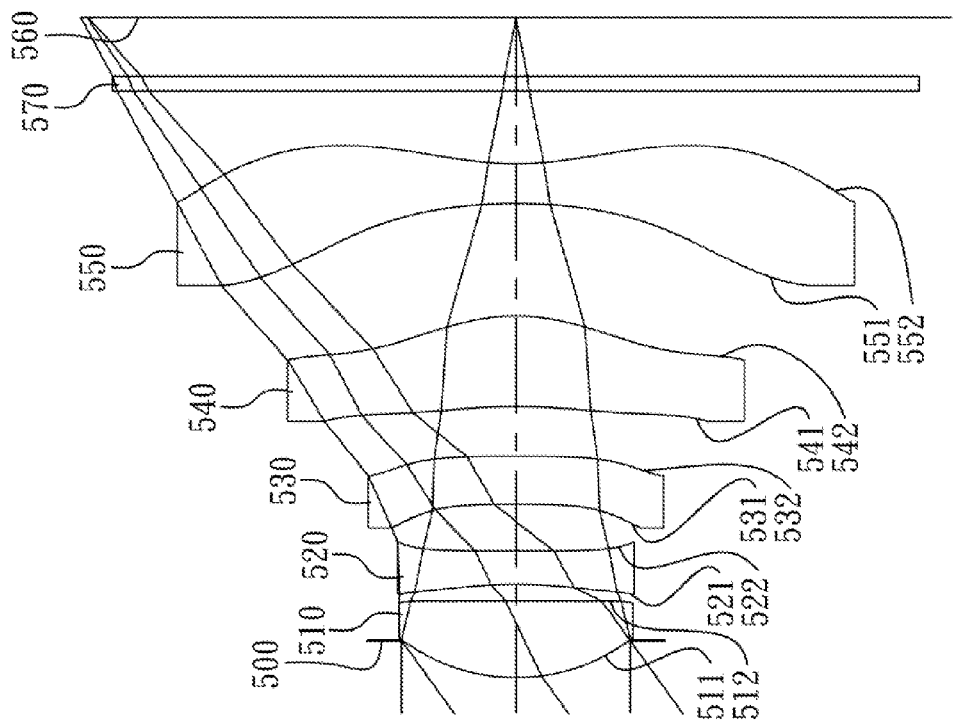
FIG. 9 is a schematic view of a photographing lens assembly according to the 5th embodiment of the present disclosure.
Figure 10:
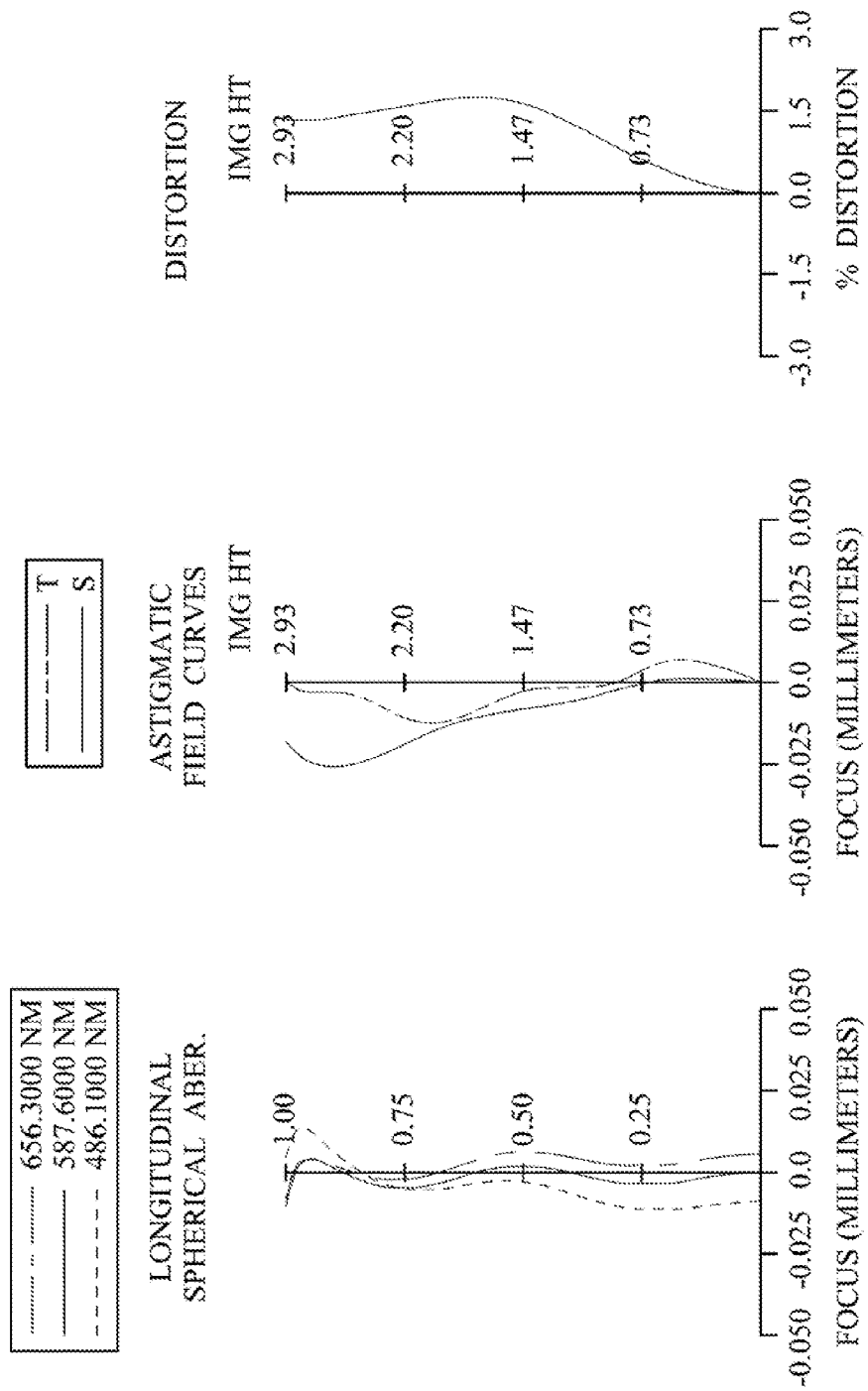
FIG. 10 shows spherical aberration curves, astigmatic field curves and a distortion curve of the photographing lens assembly according to the 5th embodiment.

FIG. 9 is a schematic view of a photographing lens assembly according to to the 5th embodiment of the present disclosure. FIG. 10 shows spherical aberration curves, astigmatic field curves and a distortion curve of the photographing lens assembly according to the 5th embodiment. In FIG. 9, the photographing lens assembly includes, in order from an object side to an image side, a stop, which is an aperture stop 500, followed by a first lens element 510, a second lens element 520, a third lens element 530, a fourth lens element 540, a fifth lens element 550, an IR-cut filter 570 and an image plane 560.

The first lens element 510 with positive refractive power has an object-side surface 511 being convex at a paraxial region thereof and an image-side surface 512 being convex at a paraxial region thereof. The first lens element 510 is made of plastic material, and has the object-side surface 511 and the image-side surface 512 being both aspheric.

The second lens element 520 with negative refractive power has an object-side surface 521 being concave at a paraxial region thereof and an image-side surface 522 being convex at a paraxial region thereof. The second lens element 520 is made of plastic material and has the object-side surface 521 and the image-side surface 522 being both aspheric.

The third lens element 530 with negative refractive power has an object-side surface 531 being concave at a paraxial region thereof and an image-side surface 532 being convex at a paraxial region thereof. The third lens element 530 is made of plastic material, and has the object-side surface 531 and the image-side surface 532 being both aspheric.

The fourth lens element 540 with positive refractive power has an object-side surface 541 being concave at a paraxial region thereof and an image-side surface 542 being convex at a paraxial region thereof. The fourth lens element 540 is made of plastic material and has the object-side surface 541 and the image-side surface 542 being both aspheric.

The fifth lens element 550 with negative refractive power has an object-side surface 551 being concave at a paraxial region thereof, and has an image-side surface 552 being concave at a paraxial region thereof and being convex at a peripheral region thereof. The fifth lens element 550 is made of plastic material, and has the object-side surface 551 and the image-side surface 552 being both aspheric.

The IR-cut filter 570 is made of glass material and located between the fifth lens element 550 and the image plane 560, and will not affect the focal length of the photographing lens assembly.

The detailed optical data of the 5th embodiment are shown in Table 9 and the aspheric surface data are shown in Table 10 below.

TABLE 9

5th Embodiment
f = 4.02 mm, Fno = 2.57, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.253 | | | | |
| 2 | Lens 1 | 1.331 | ASP | 0.521 | Plastic | 1.514 | 56.8 | 2.56 |
| 3 | | −87.184 | ASP | 0.116 | | | | |
| 4 | Lens 2 | −3.000 | ASP | 0.230 | Plastic | 1.634 | 23.8 | −4.88 |
| 5 | | −100.000 | ASP | 0.315 | | | | |
| 6 | Lens 3 | −19.645 | ASP | 0.333 | Plastic | 1.634 | 23.8 | −38.62 |
| 7 | | −100.000 | ASP | 0.338 | | | | |
| 8 | Lens 4 | −3.930 | ASP | 0.623 | Plastic | 1.546 | 48.9 | 3.43 |
| 9 | | −1.338 | ASP | 0.769 | | | | |
| 10 | Lens 5 | −3.655 | ASP | 0.270 | Plastic | 1.514 | 56.8 | −2.59 |
| 11 | | 2.141 | ASP | 0.500 | | | | |
| 12 | IR-cut filter | Plano | | 0.100 | Glass | 1.517 | 64.2 | — |
| 13 | | Plano | | 0.403 | | | | |
| 14 | Image | Plano | | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | −2.0920E+00 | −1.0000E+02 | −3.1437E+01 | −1.0000E+02 | 1.0000E+02 |
| A4 = | 1.2902E−01 | 7.0631E−03 | −6.6242E−03 | 9.1933E−02 | −3.0994E−01 |
| A6 = | −5.9380E−02 | 3.3049E−02 | 1.1473E−01 | 4.0007E−02 | 3.7774E−02 |
| A8 = | 4.0498E−01 | −7.4957E−02 | 1.5300E−01 | −4.3570E−02 | −3.0843E−01 |
| A10 = | −1.1112E+02 | −7.0302E−02 | −1.0862E+00 | 3.0535E−01 | 5.8030E−01 |
| A12 = | 1.6005E+00 | 4.8566E−02 | 1.9751E+00 | −4.8439E−01 | −1.5459E−01 |
| A14 = | −9.3645E−01 | −7.9435E−01 | −1.4979E+00 | 4.3818E−01 | |

| Surface # | 7 | 8 | 9 | 10 | 11 |
|---|---|---|---|---|---|
| k = | −1.0000E+00 | −1.6411E+00 | −5.0866E+00 | −4.8186E+00 | −9.9526E+00 |
| A4 = | −1.6902E−01 | 1.1759E−01 | −5.6195E−02 | −3.3669E−02 | −7.0481E−02 |
| A6 = | −3.6699E−02 | −1.1049E−03 | 1.7301E−01 | −2.7118E−02 | 2.1005E−02 |
| A8 = | −2.0970E−01 | −1.2911E−01 | −1.0744E−01 | 2.5687E−02 | −6.1186E−03 |
| A10 = | 1.1078E−01 | 1.3805E−01 | 3.1033E−01 | −7.3891E−03 | 1.3123E−03 |
| A12 = | −1.1136E−02 | −6.4768E−02 | −4.9173E−03 | 9.5809E−04 | −1.7420E−04 |
| A14 = | | 1.1289E−02 | 3.7348E−04 | −4.7565E−05 | 1.0471E−05 |

In the photographing lens assembly according to the 5th embodiment, the definitions of the following parameters are the same as those stated in the 1st embodiment with corresponding values for the 5th embodiment. Moreover, these parameters can be calculated from Table 9 and Table 10 as the following values and satisfy the following relationships:

| f (mm) | 4.02 | (T34 + T45)/CT3 | 3.324 |
|---|---|---|---|
| Fno | 2.57 | (R1 + R2)/(R1 − R2) | −0.97 |
| HFOV (deg.) | 35.8 | f/R4 | −0.04 |
| V2 + V3 | 47.6 | (|R1 × R4| + |R2 × R3|)/|R2 × R4| | 0.05 |
| T45 (mm) | 0.769 | R6/f3 | 2.59 |
| T12/T23 | 0.368 | |f/R5| + |f/R6| | 0.24 |
| T45/CT4 | 1.234 | (R9 + R10)/(R9 − R10) | 0.26 |
| T45/CT5 | 2.848 | f/f4 | 1.17 |

6th Embodiment

Figure 11:
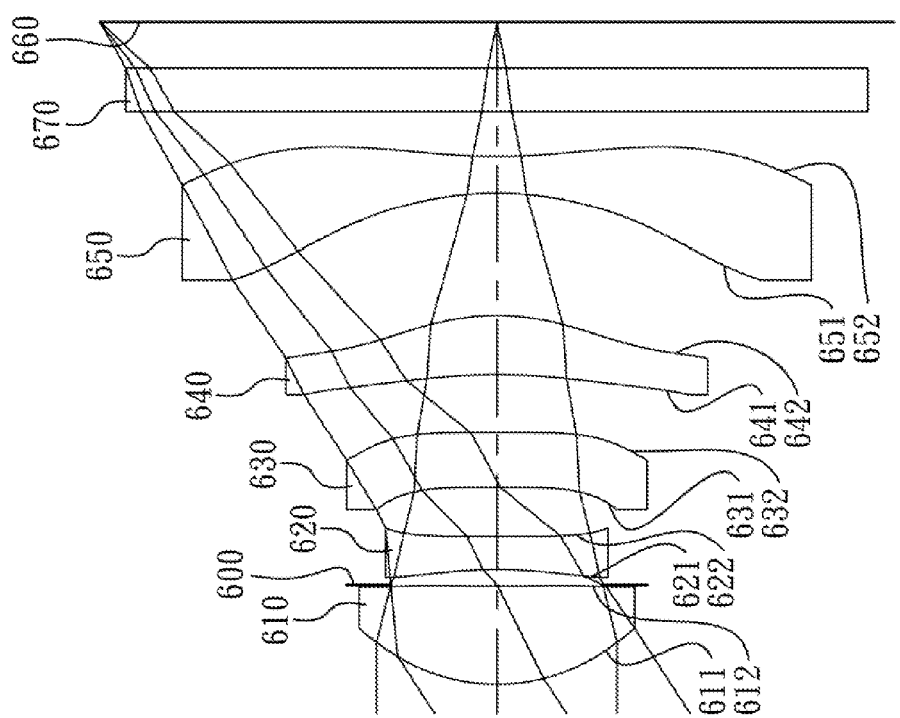
FIG. 11 is a schematic view of a photographing lens assembly according to the 6th embodiment of the present disclosure.
Figure 12:
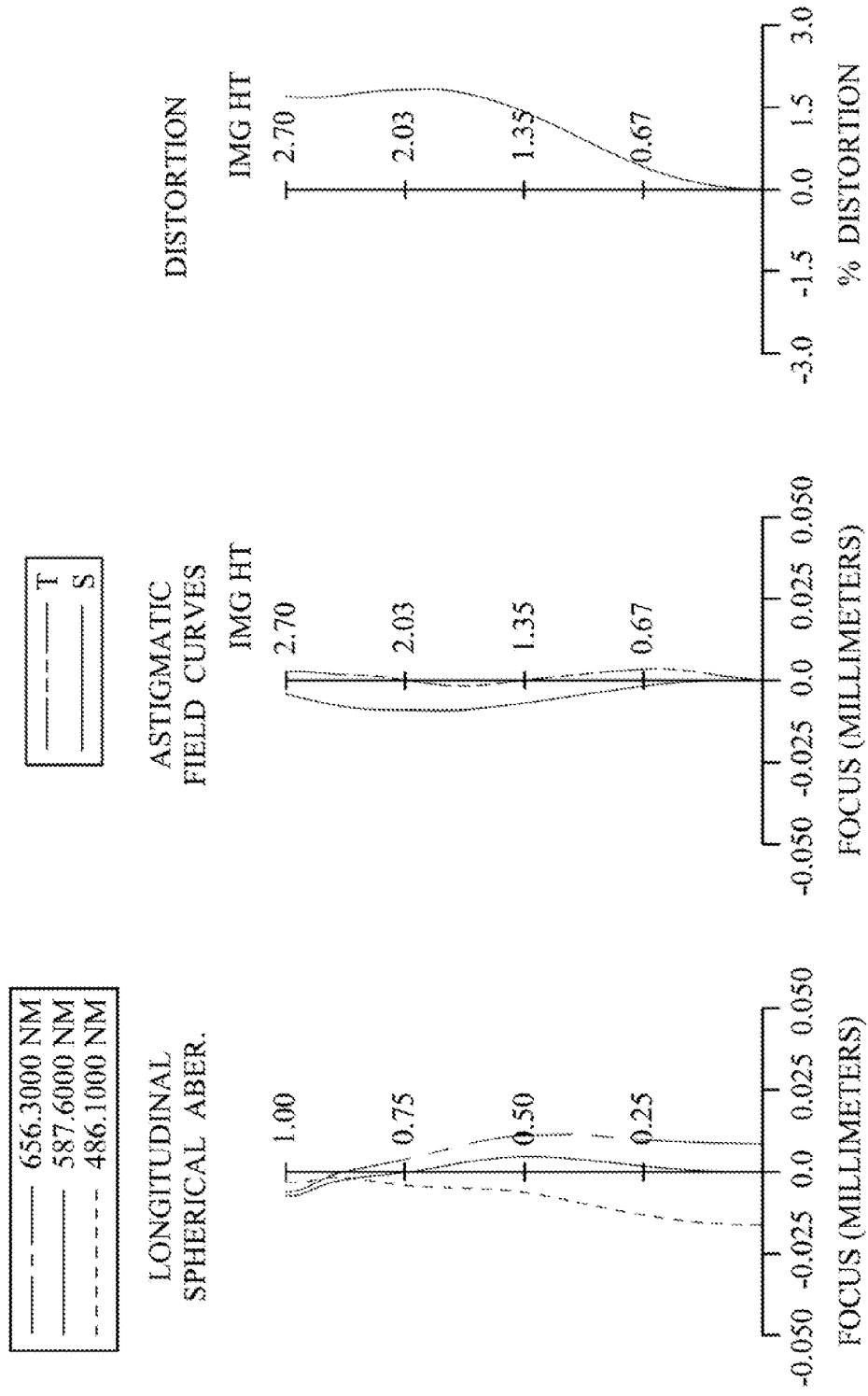
FIG. 12 shows spherical aberration curves, astigmatic field curves and a distortion curve of the photographing lens assembly according to the 6th embodiment.

FIG. 11 is a schematic view of a photographing lens assembly according to the 6th embodiment of the present disclosure. FIG. 12 shows spherical aberration curves, astigmatic field curves and a distortion curve of the photographing lens assembly according to the 6th embodiment. In FIG. 11, the photographing lens assembly includes, in order from an object side to an image side, a first lens element 610, a stop, which is an aperture stop 600, followed by a second lens element 620, a third lens element 630, a fourth lens element 640, a fifth lens element 650, an IR-cut filter 670 and an image plane 660.

The first lens element 610 with positive refractive power has an object-side surface 611 being convex at a paraxial region thereof and an image-side surface 612 being concave at a paraxial region thereof. The first lens element 610 is made of plastic material, and has the object-side surface 611 and the image-side surface 612 being both aspheric.

The second lens element 620 with negative refractive power has an object-side surface 621 being concave at a paraxial region thereof and an image-side surface 622 being convex at a paraxial region thereof. The second lens element 620 is made of plastic material, and has the object-side surface 621 and the image-side surface 622 being both aspheric.

The third lens element 630 with negative refractive power has an object-side surface 631 being concave at a paraxial region thereof and an image-side surface 632 being concave at a paraxial region thereof. The third lens element 630 is made of plastic material, and has the object-side surface 631 and the image-side surface 632 being both aspheric.

The fourth lens element 640 with positive refractive power has an object-side surface 641 being concave at a paraxial region thereof and an image-side surface 642 being convex at a paraxial region thereof. The fourth lens element 640 is made of plastic material and has the object-side surface 641 and the image-side surface 642 being both aspheric.

The fifth lens element 650 with negative refractive power has an object-side surface 651 being concave at a paraxial region thereof, and has an image-side surface 652 being concave at a paraxial region thereof and being convex at a peripheral region thereof. The fifth lens element 650 is made of plastic material, and has the object-side surface 651 and the image-side surface 652 being both aspheric.

The IR-cut filter 670 is made of glass material and located between the fifth lens element 650 and the image plane 660, and will not affect the focal length of the photographing lens assembly.

The detailed optical data of the 6th embodiment are shown in Table 11 and the aspheric surface data are shown in Table 12 below.

TABLE 11

6th Embodiment
f = 4.08 mm, Fno = 2.50, HFOV = 33.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.301 | ASP | 0.666 | Plastic | 1.514 | 56.8 | 2.67 |
| 2 | | 21.149 | ASP | 0.006 | | | | |
| 3 | Ape. Stop | Plano | | 0.104 | | | | |
| 4 | Lens 2 | −3.194 | ASP | 0.230 | Plastic | 1.634 | 23.8 | −5.21 |
| 5 | | −98.551 | ASP | 0.333 | | | | |
| 6 | Lens 3 | −56.051 | ASP | 0.370 | Plastic | 1.634 | 23.8 | −51.95 |
| 7 | | 80.064 | ASP | 0.396 | | | | |
| 8 | Lens 4 | −3.870 | ASP | 0.400 | Plastic | 1.566 | 41.3 | 4.07 |
| 9 | | −1.498 | ASP | 0.832 | | | | |
| 10 | Lens 5 | −2.276 | ASP | 0.250 | Plastic | 1.514 | 56.8 | −2.80 |
| 11 | | 4.050 | ASP | 0.300 | | | | |
| 12 | IR-cut filter | Plano | | 0.300 | Glass | 1.517 | 64.2 | — |
| 13 | | Plano | | 0.313 | | | | |
| 14 | Image | Plano | | — | | | | |

Note:
Reference wavelength (d-line) is 587.6 nm.

TABLE 12

| Aspheric Coefficients | | | | | |
|---|---|---|---|---|---|
| Surface# | 1 | 2 | 4 | 5 | 6 |
| k = | −5.1138E+00 | −1.0000E+02 | −3.1039E+01 | 1.0000E+02 | 1.0000E+02 |
| A4 = | 2.9211E−01 | −5.8629E−02 | −6.1875E−02 | 8.2900E−02 | −2.8429E−01 |

TABLE 12-continued

| Aspheric Coefficients | | | | | |
|---|---|---|---|---|---|
| A6 = | −2.6777E−01 | −5.7254E−02 | 2.4592E−01 | 2.2438E−01 | −2.3486E−03 |
| A8 = | 4.2011E−01 | 4.7456E−01 | 1.8329E−01 | −2.2410E−01 | −1.2782E−01 |
| A10 = | −5.6253E−01 | −1.3197E+00 | −1.5567E+00 | 2.4438E−01 | 6.5063E−02 |
| A12 = | 5.1142E−01 | 1.6312E+00 | 2.6632E+00 | −2.7115E−01 | −2.1665E−02 |
| A14 = | −2.4269E−01 | −7.944.9E−01 | −1.4978E+00 | 4.3820E−01 | |

| Surface # | 7 | 8 | 9 | 10 | 11 |
|---|---|---|---|---|---|
| k = | −1.0000E+00 | 2.1721E+00 | −5.0361E+00 | −2.5573E+00 | −1.4363E−01 |
| A4 = | −1.8893E−01 | 4.0397E−02 | −6.3373E−02 | 1.0516E−03 | −7.8250E−02 |
| A6 = | −2.0539E−02 | 8.3656E−02 | 1.6422E−01 | −3.4558E−02 | 2.1076E−02 |
| A8 = | −8.8840E−03 | −1.6892E−01 | −9.8699E−02 | 2.5518E−02 | −5.9227E−03 |
| A10 = | 1.0781E−02 | 1.4157E−01 | 3.0039E−02 | −7.2557E−03 | 1.2568E−03 |
| A12 = | 2.1433E−02 | −5.6821E−02 | −6.1330E−03 | 9.8144E−04 | −1.7301E−04 |
| A14 = | | 8.5433E−03 | 6.5412E−04 | −5.1473E−05 | 1.1533E−05 |

In the photographing lens assembly according to the 6th embodiment, the definitions of the following parameters are the same as those stated in the 1st embodiment with corresponding values for the 6th embodiment. Moreover, these parameters can be calculated from Table 11 and Table 12 as the following values and satisfy the following relationships:

| f (mm) | 4.08 | (T34 + T45)/CT3 | 3.319 |
|---|---|---|---|
| Fno | 2.50 | (R1 + R2)/(R1 − R2) | −1.13 |
| HFOV (deg.) | 33.0 | f/R4 | −0.04 |
| V2 + V3 | 47.6 | (|R1 × R4| + |R2 × R3|)/|R2 × R4| | 0.09 |
| T45 (mm) | 0.832 | R6/f3 | −1.54 |
| T12/T23 | 0.330 | |f/R5|+ |f/R6| | 0.12 |
| T45/CT4 | 2.080 | (R9 + R10)/(R9 − R10) | −0.28 |
| T45/CT5 | 3.328 | f/f4 | 1.00 |

7th Embodiment

Figure 13:
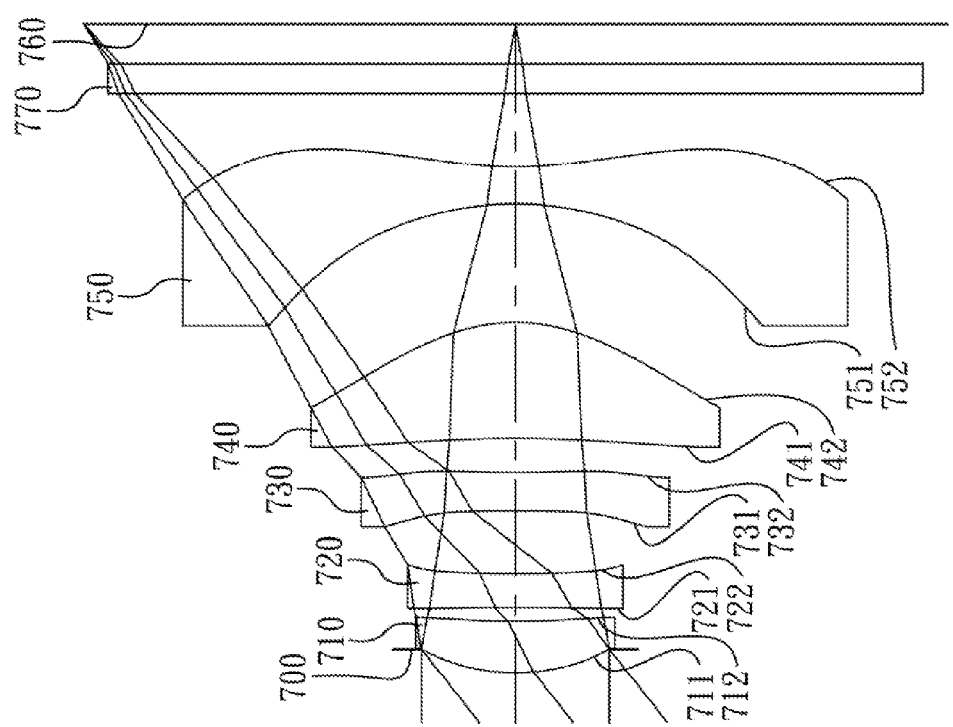
FIG. 13 is a schematic view of a photographing lens assembly according to the 7th embodiment of the present disclosure.
Figure 14:
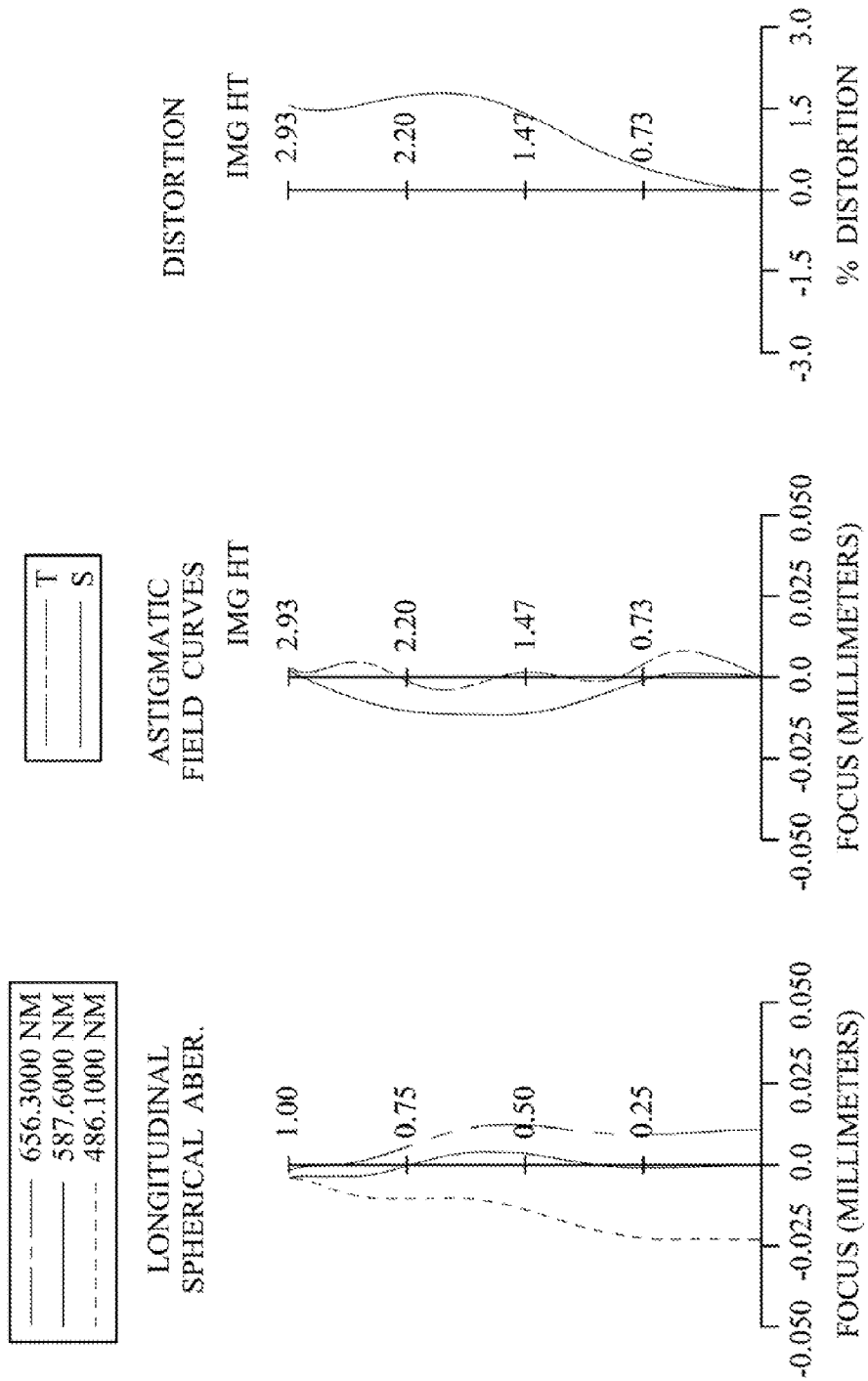
FIG. 14 shows spherical aberration curves, astigmatic field curves and a distortion curve of the photographing lens assembly according to the 7th embodiment.

FIG. 13 is a schematic view of a photographing lens assembly according to the 7th embodiment of the present disclosure. FIG. 14 shows spherical aberration curves, astigmatic field curves and a distortion curve of the photographing lens assembly according to the 7th embodiment. In FIG. 13, the photographing lens assembly includes, in order from an object side to an image side, a stop, which is an aperture stop 700, followed by a first lens element 710, a second lens element 720, a third lens element 730, a fourth lens element 740, a fifth lens element 750, an IR-cut filter 770 and an image plane 760.

The first lens element 710 with positive refractive power has an object-side surface 711 being convex at a paraxial region thereof and an image-side surface 712 being concave at a paraxial region thereof. The first lens element 710 is made of plastic material, and has the object-side surface 711 and the image-side surface 712 being both aspheric.

The second lens element 720 with negative refractive power has an object-side surface 721 being convex at a paraxial region thereof and an image-side surface 722 being concave at a paraxial region thereof. The second lens element 720 is made of plastic material, and has the object-side surface 721 and the image-side surface 722 being both aspheric.

The third lens element 730 with negative refractive power has an object-side surface 731 being convex at a paraxial region thereof and an image-side surface 732 being concave at a paraxial region thereof. The third lens element 730 is made of plastic material, and has the object-side surface 731 and the image-side surface 732 being both aspheric.

The fourth lens element 740 with positive refractive power has an object-side surface 741 being concave at a paraxial region thereof and an image-side surface 742 being convex at a paraxial region thereof. The fourth lens element 740 is made of plastic material and has the object-side surface 741 and the image-side surface 742 being both aspheric.

The fifth lens element 750 with negative refractive power has an object-side surface 751 being concave at a paraxial region thereof, and has an image-side surface 752 being concave at a paraxial region thereof and being convex at a peripheral region thereof. The fifth lens element 750 is made of plastic material, and has the object-side surface 751 and the image-side surface 752 being both aspheric.

The IR-cut filter 770 is made of glass material and located between the fifth lens element 750 and the image plane 760, and will not affect the focal length of the photographing lens assembly.

The detailed optical data of the 7th embodiment are shown in Table 13 and the aspheric surface data are shown in Table 14 below.

TABLE 13

7th Embodiment
f = 3.66 mm, Fno = 2.87, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.160 | | | | |
| 2 | Lens 1 | 1.343 | ASP | 0.351 | Plastic | 1.514 | 56.8 | 3.63 |
| 3 | | 4.382 | ASP | 0.095 | | | | |
| 4 | Lens 2 | 62.994 | ASP | 0.230 | Plastic | 1.634 | 23.8 | −17.43 |
| 5 | | 9.389 | ASP | 0.421 | | | | |
| 6 | Lens 3 | 63.793 | ASP | 0.265 | Plastic | 1.634 | 23.8 | −10.72 |

TABLE 13-continued

7th Embodiment
f = 3.66 mm, Fno = 2.87, HFOV = 38.3 deg.

| Surface # | | Curvature Radius | | Thickness | Material | Index | Abbe # | Focal Length |
|---|---|---|---|---|---|---|---|---|
| 7 | | 6.131 | ASP | 0.233 | | | | |
| 8 | Lens 4 | −7.657 | ASP | 0.788 | Plastic | 1.544 | 55.9 | 2.51 |
| 9 | | −1.202 | ASP | 0.804 | | | | |
| 10 | Lens 5 | −2.094 | ASP | 0.250 | Plastic | 1.514 | 56.8 | −2.29 |
| 11 | | 2.789 | ASP | 0.500 | | | | |
| 12 | IR-cut filter | Plano | | 0.200 | Glass | 1.517 | 64.2 | — |
| 13 | | Plano | | 0.274 | | | | |
| 14 | Image | Plano | | — | | | | |

Note:
Reference wavelength (d-line) is 587.6 nm.

TABLE 14

Aspheric Coefficients

| Surface # | 2 | 3 | 4 | 5 | 6 |
|---|---|---|---|---|---|
| k = | −2.4146E+00 | −4.5318E+01 | 1.0000E+02 | −2.7973E+01 | 1.0000E+02 |
| A4 = | 1.3792E−01 | −6.8726E−02 | −1.7332E−01 | −6.0900E−02 | −3.0336E−01 |
| A6 = | −3.7792E−02 | 1.1917E−02 | 1.9642E−01 | 3.0959E−01 | 1.1491E−01 |
| A8 = | 2.5388E−01 | −1.3162E−01 | 5.2482E−01 | 6.1800E−02 | −1.1063E−01 |
| A10 = | −8.1904E−01 | 3.7295E−01 | −1.5201E+00 | 1.3990E−01 | 4.1011E−01 |
| A12 = | 1.2744E−00 | 5.3106E−02 | 2.2152E+00 | −5.4178E−01 | −2.5858E−01 |
| A14 = | −9.3645E−01 | −7.9435E−01 | −1.4979E+00 | 4.3818E−01 | |

| Surface # | 7 | 8 | 9 | 10 | 11 |
|---|---|---|---|---|---|
| k = | −1.0000E+02 | 3.0721E+01 | −3.9034E+00 | −6.9643E+00 | −1.3588E−00 |
| A4 = | −1.5856E−01 | 2.8055E−02 | −1.3360E−01 | −3.4344E−02 | −9.0541E−02 |
| A6 = | 3.5488E−02 | 5.5687E−02 | 1.4240E−01 | −3.6362E−02 | 2.5912E−02 |
| A8 = | −1.4851E−02 | −1.3630E−01 | −8.6591E−02 | 2.3116E−02 | −6.9240E−03 |
| A10 = | 8.9575E−02 | 1.3680E−01 | 3.2595E−02 | −7.2444E−03 | 1.2763E−03 |
| A12 = | −4.1450E−02 | −6.2747E−02 | −5.9036E−03 | 1.0792E−03 | −1.4690E−04 |
| A14 = | | 1.1303E−02 | 2.2070E−04 | −2.3849E−05 | 7.7306E−06 |

In the photographing lens assembly according to the 7th embodiment, the definitions of the following parameters are the same as those stated in the 1st embodiment with corresponding values for the 7th embodiment. Moreover, these parameters can be calculated from Table 13 and Table 14 as the following values and satisfy the following relationships:

| f (mm) | 3.66 | (T34 + T45)/CT3 | 3.913 |
|---|---|---|---|
| Fno | 2.87 | (R1 + R2)/(R1 − R2) | −1.88 |
| HFOV (deg.) | 38.3 | f/R4 | 0.39 |
| V2 + V3 | 47.6 | (|R1 × R4| + |R2 × R3|)/|R2 × R4| | 7.02 |
| T45 (mm) | 0.804 | R6/f3 | −0.57 |
| T12/T23 | 0.226 | |f/R5| + |f/R6| | 0.65 |
| T45/CT4 | 1.020 | (R9 + R10)/(R9 − R10) | −0.14 |
| T45/CT5 | 3.216 | f/f4 | 1.46 |

8th Embodiment

Figure 15:
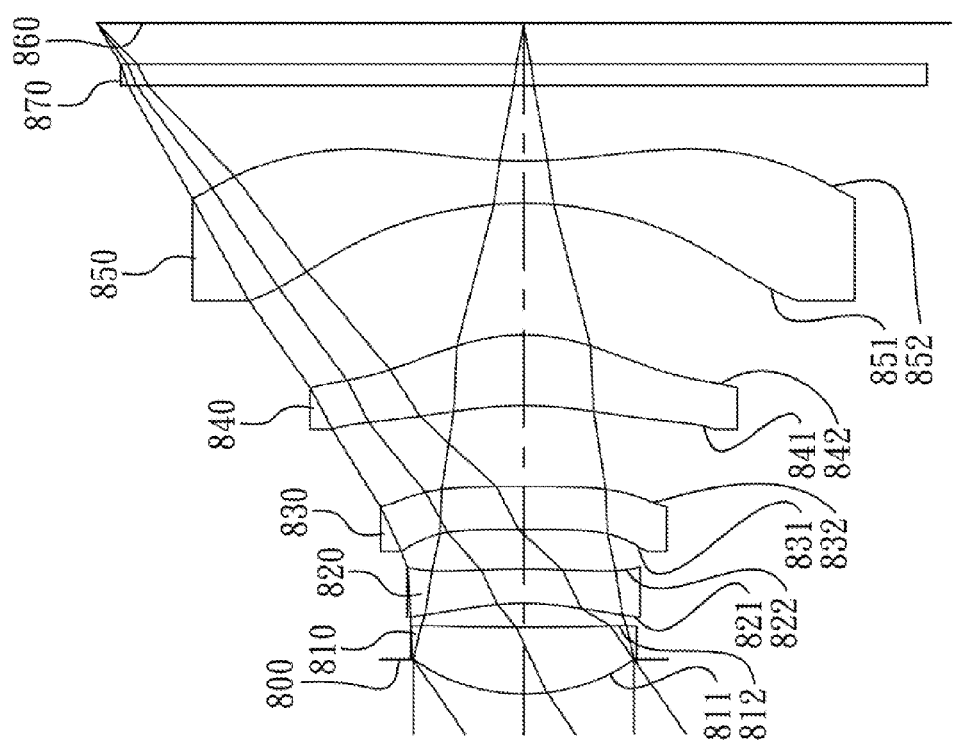
FIG. 15 is a schematic view of a photographing lens assembly according to the 8th embodiment of the present disclosure.
Figure 16:
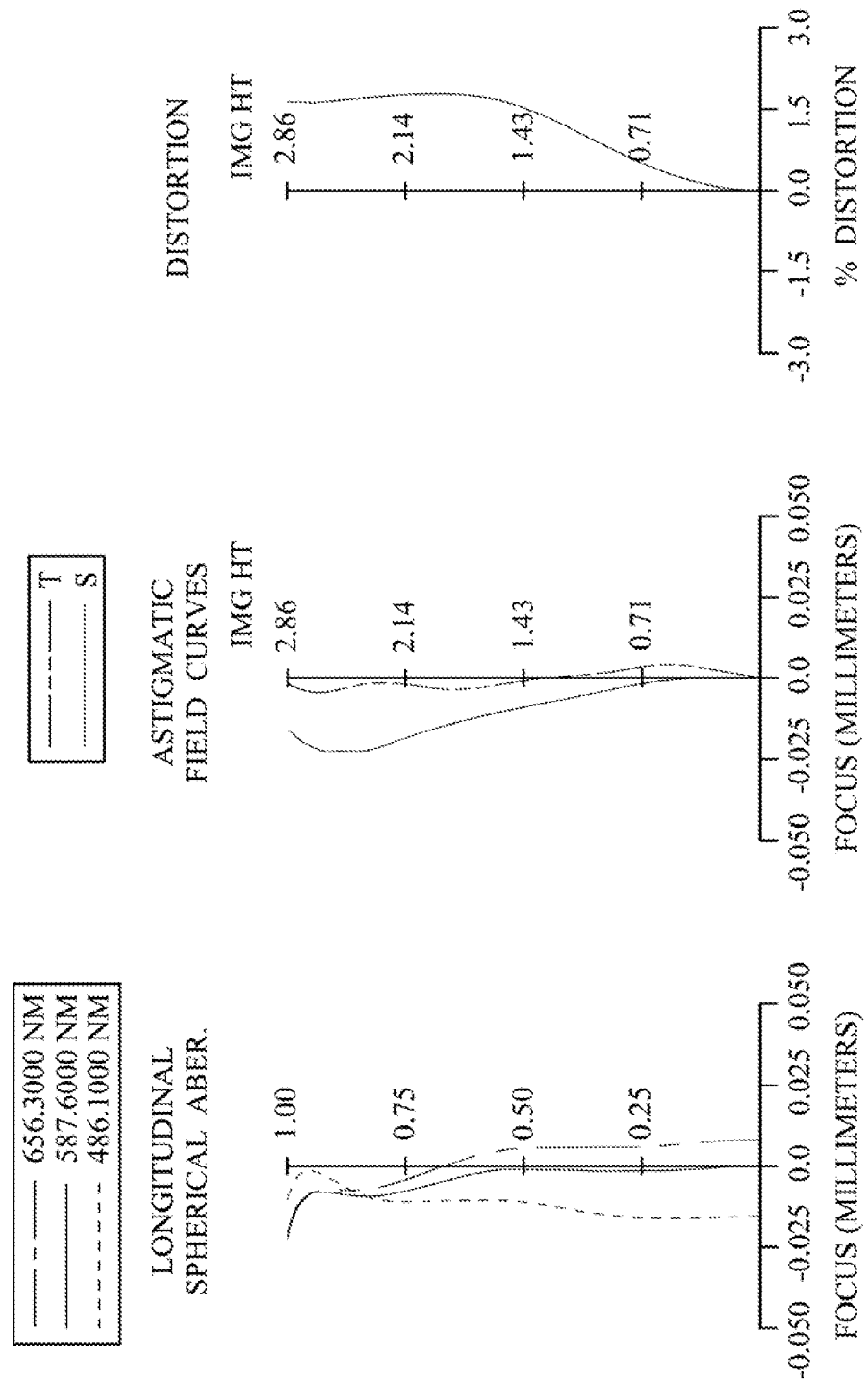
FIG. 16 shows spherical aberration curves, astigmatic field curves and a distortion curve of the photographing lens assembly according to the 8th embodiment.

FIG. 15 is a schematic view of a photographing lens assembly according to the 8th embodiment of the present disclosure. FIG. 16 shows spherical aberration curves, astigmatic field curves and a distortion curve of the photographing lens assembly according to the 8th embodiment. In FIG. 15, the photographing lens assembly includes, in order from an object side to an image side, a stop, which is an aperture stop 800, followed by a first lens element 810, a second lens element 820, a third lens element 830, a fourth lens element 840, off a fifth lens element 850, an IR-cut filter 870 and an image plane 860.

The first lens element 810 with positive refractive power has an object-side surface 811 being convex at a paraxial region thereof and an image-side surface 812 being concave at a paraxial region thereof. The first lens element 810 is made of plastic material, and has the object-side surface 811 and the image-side surface 812 being both aspheric.

The second lens element 820 with negative refractive power has an object-side surface 821 being concave at a paraxial region thereof and an image-side surface 822 being convex at a paraxial region thereof. The second lens element 820 is made of plastic material, and has the object-side surface 821 and the mage-side surface 822 being both aspheric.

The third lens element 830 with positive refractive power has an object-side surface 831 being convex at a paraxial region thereof and an image-side surface 832 being convex at a paraxial region thereof. The third lens element 830 is made of plastic material, and has the object-side surface 831 and the image-side surface 832 being both aspheric.

The fourth lens element 840 with positive refractive power has an object-side surface 841 being concave at a paraxial region thereof and an image-side surface 842 being convex at a paraxial region thereof. The fourth lens element 840 is made of plastic material and has the object-side surface 841 and the image-side surface 842 being both aspheric.

The fifth lens element 850 with negative refractive power has an object-side surface 851 being concave at a paraxial region thereof, and has an image-side surface 852 being concave at a paraxial region thereof and being convex at a peripheral region thereof. The fifth lens element 850 is made of plastic material, and has the object-side surface 851 and the image-side surface 852 being both aspheric.

The IR-cut filter 870 is made of glass material and located between the fifth lens element 850 and the image plane 860, and will not affect the focal length of the photographing lens assembly.

The detailed optical data of the 8th embodiment are shown in Table 15 and the aspheric surface data are shown in Table 16 below.

TABLE 15

8th Embodiment
f = 4.05 mm, Fno = 2.74, HFOV = 34.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.232 | | | | |
| 2 | Lens 1 | 1.303 | ASP | 0.450 | Plastic | 1.514 | 56.8 | 2.70 |
| 3 | | 19.476 | ASP | 0.159 | | | | |
| 4 | Lens 2 | −1.972 | ASP | 0.230 | Plastic | 1.634 | 23.8 | −5.14 |
| 5 | | −5.219 | ASP | 0.260 | | | | |
| 6 | Lens 3 | 35.977 | ASP | 0.292 | Plastic | 1.634 | 23.8 | 41.77 |
| 7 | | −100.000 | ASP | 0.539 | | | | |
| 8 | Lens 4 | −2.553 | ASP | 0.478 | Plastic | 1.544 | 55.9 | 4.09 |
| 9 | | −1.268 | ASP | 0.878 | | | | |
| 10 | Lens 5 | −2.655 | ASP | 0.287 | Plastic | 1.544 | 55.9 | −2.65 |
| 11 | | 3.269 | ASP | 0.500 | | | | |
| 12 | IR-cut filter | Plano | | 0.145 | Glass | 1.517 | 64.2 | — |
| 13 | | Plano | | 0.279 | | | | |
| 14 | Image | Plano | | — | | | | |

Note:
Reference wavelength (d-line) is 587.6 nm.

TABLE 16

Aspheric Coefficients

| Surface # | 2 | 3 | 4 | 5 | 6 |
|---|---|---|---|---|---|
| k = | −2.6398E+00 | 5.0000E+01 | −1.3572E+01 | −5.7309E+01 | 5.0000E+01 |
| A4 = | 1.6822E−01 | 9.5742E−03 | 5.2260E−02 | 1.5814E−01 | −2.6294E−01 |
| A6 = | −2.8243E−02 | −1.2047E−02 | −2.8901E−02 | −1.8133E−01 | −2.2073E−01 |
| A8 = | 1.4884E−01 | −5.6154E−02 | 2.1793E−01 | 3.4302E−01 | 1.6903E−01 |
| A10 = | −4.1431E−01 | −1.6973E−01 | −7.5028E−01 | −2.2973E−02 | −4.0381E−01 |
| A12 = | 7.5574E−01 | 7.8260E−01 | 1.5176E+00 | −3.9726E−01 | 6.0625E−01 |
| A14 = | −6.0170E−01 | −9.8137E−01 | −1.1867E+00 | 6.4327E−01 | |

| Surface # | 7 | 8 | 9 | 10 | 11 |
|---|---|---|---|---|---|
| k = | −1.0000E+00 | 1.1408E−02 | −3.6741E+00 | −5.8889E+00 | −1.0222E+01 |
| A4 = | −1.4247E−01 | 9.6272E−02 | −5.6063E−02 | −2.4330E−02 | −6.7547E−02 |
| AS = | −1.4052E−01 | 9.3403E−02 | 1.5945E−01 | −3.4148E−02 | 1.9448E−02 |
| A8 = | 9.3567E−02 | −1.8948E−01 | −8.9639E−02 | 2.5086E−02 | −5.7496E−03 |
| A10 = | −2.7672E−02 | 1.4445E−01 | 2.7251E−02 | 6.9894E−03 | 1.3033E−03 |
| A12 = | 7.7020E−02 | −5.5703E−02 | −7.5854E−03 | 1.0217E−03 | −1.8443E−04 |
| A14 = | | 7.9730E−03 | 1.2336E−03 | −6.3773E−05 | 1.1894E−05 |

In the photographing lens assembly according to the 8th embodiment, the definitions of the following parameters are the same as those stated in the 1st embodiment with corresponding values for the 8th embodiment. Moreover, these parameters can be calculated from Table 15 and Table 16 as the following values and satisfy the following relationships:

| f (mm) | 4.05 | (T34 + T45)/CT3 | 4.853 |
|---|---|---|---|
| Fno | 2.74 | (R1 + R2)/(R1 − R2) | −1.14 |
| HFOV (deg.) | 34.8 | f/R4 | −0.78 |
| V2 + V3 | 47.6 | (|R1 × R4|+|R2 × R3|)/|R2 × R4| | 0.45 |
| T45 (mm) | 0.878 | R01f3 | −2.39 |
| T12/T23 | 0.612 | |f/R5| + |f/R6| | 0.15 |
| T45/CT4 | 1.837 | (R9 + R10)/(R9 − R10) | −0.10 |
| T45/CT5 | 3.059 | f/f4 | 0.99 |

9th Embodiment

Figure 17:
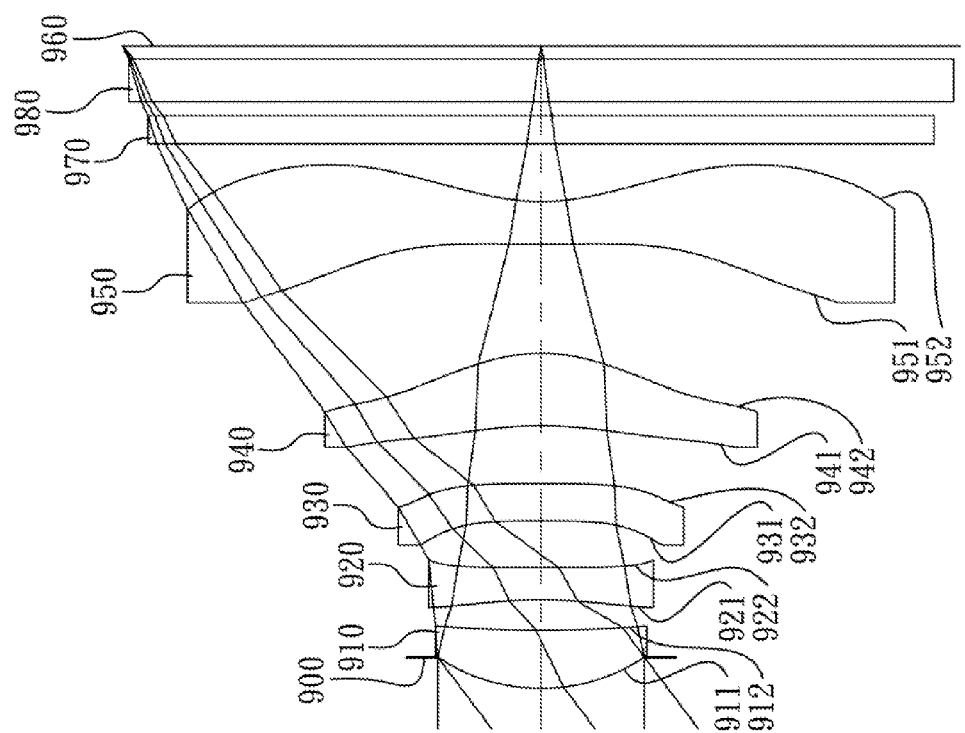
FIG. 17 is a schematic view of a photographing lens assembly according to the 9th embodiment of the present disclosure.
Figure 18:
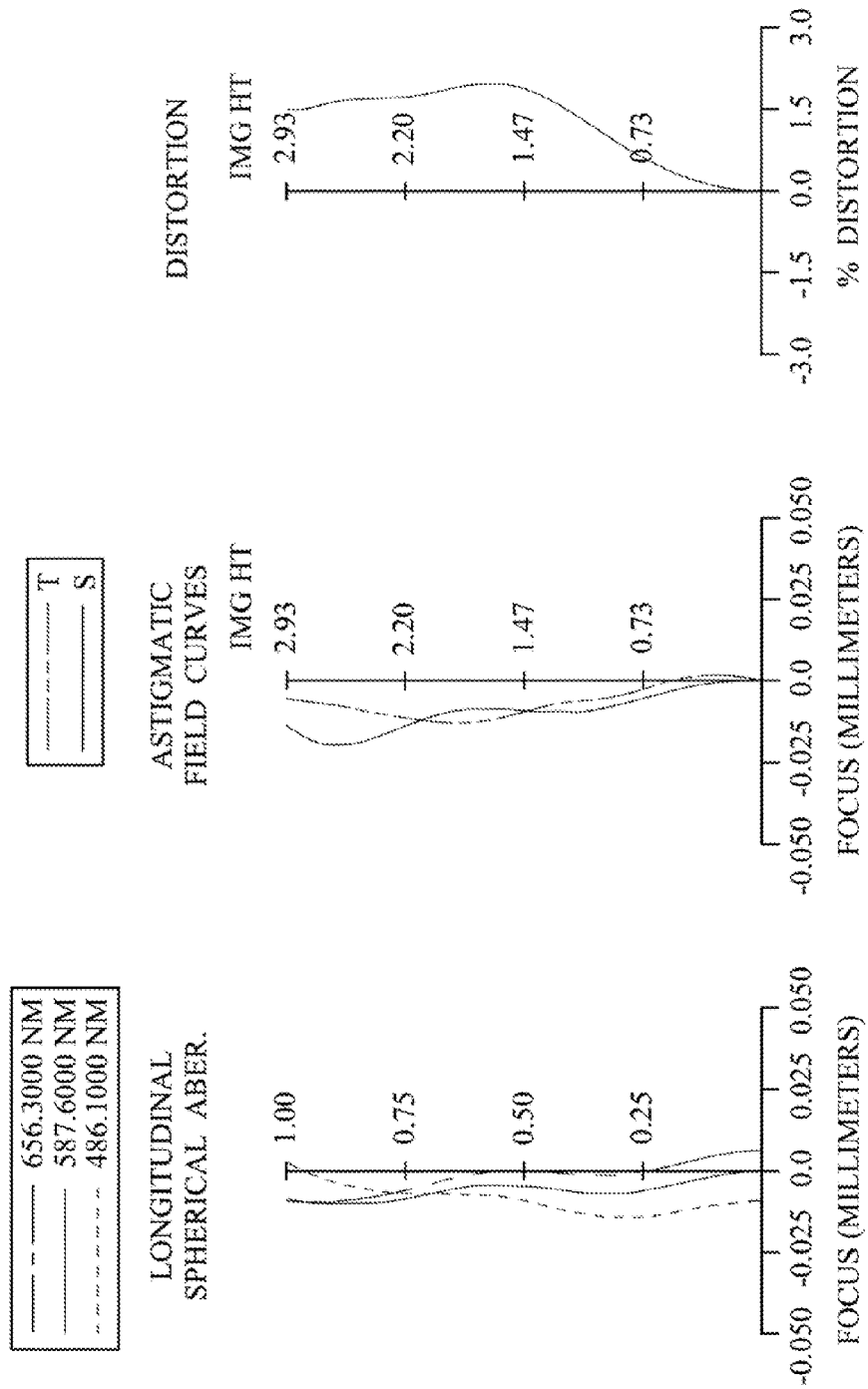
FIG. 18 shows spherical aberration curves, astigmatic field curves and a distortion curve of the photographing lens assembly according to the 9th embodiment.

FIG. 17 is a schematic view of a photographing lens assembly according to the 9th embodiment of the present disclosure. FIG. 18 shows spherical aberration curves, astigmatic field curves and a distortion curve of the photographing lens assembly according to the 9th embodiment. In FIG. 17, the photographing lens assembly includes, in order from an object side to an image side, a stop, which is an aperture stop 900, followed by a first lens element 910, a second lens element 920, a third lens element 930, a fourth lens element 940, a fifth lens element 950, an IR-cut filter 970, a cover glass 980 and an image plane 960.

The first lens element 910 with positive refractive power has an object-side surface 911 being convex at a paraxial region thereof and an image-side surface 912 being concave at a paraxial region thereof. The first lens element 910 is made of glass material, and has the object-side surface 911 and the image-side surface 912 being both aspheric.

The second lens element 920 with negative refractive power has an object-side surface 921 being concave at a paraxial region thereof and an image-side surface 922 being convex at a paraxial region thereof. The second lens element 920 is made of plastic material, and has the object-side surface 921 and the image-side surface 922 being both aspheric.

The third lens element 930 with negative refractive power has an object-side surface 931 being concave at a paraxial region thereof and an image-side surface 932 being convex at a paraxial region thereof. The third lens element 930 is made of plastic material, and has the object-side surface 931 and the image-side surface 932 being both aspheric.

The fourth lens element 940 with positive refractive power has an object-side surface 941 being concave at a paraxial region thereof and an image-side surface 942 being convex at a paraxial region thereof. The fourth lens element 940 is made of plastic material and has the object-side surface 941 and the image-side surface 942 being both aspheric.

The fifth lens element 950 with negative refractive power has an object-side surface 951 being convex at a paraxial region thereof, and has an image-side surface 952 being concave at a paraxial region thereof and being convex at a peripheral region thereof. The fifth lens element 950 is made of plastic material, and has the object-side surface 951 and the image-side surface 952 being both aspheric.

The IR-cut filter 970 and the cover glass 980 are made of glass material and located between the fifth lens element 950 and the image plane 860 in order, and will not affect the focal length of the photographing lens assembly.

The detailed optical data of the 9th embodiment are shown in Table 17 and the aspheric surface data are shown in Table 18 below.

TABLE 17

9th Embodiment
f = 3.84 mm, Fno = 2.65, HFOV = 37.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.217 | | | | |
| 2 | Lens 1 | 1.336 | ASP | 0.407 | Glass | 1.542 | 62.9 | 2.90 |
| 3 | | 7.963 | ASP | 0.209 | | | | |
| 4 | Lens 2 | −3.905 | ASP | 0.230 | Plastic | 1.633 | 23.4 | −6.56 |
| 5 | | −67.879 | ASP | 0.327 | | | | |
| 6 | Lens 3 | −29.231 | ASP | 0.258 | Plastic | 1.633 | 23.4 | −62.05 |
| 7 | | −114.758 | ASP | 0.409 | | | | |
| 8 | Lens 4 | −2.710 | ASP | 0.505 | Plastic | 1.544 | 55.9 | 3.63 |
| 9 | | −1.217 | ASP | 0.767 | | | | |
| 10 | Lens 5 | 28.929 | ASP | 0.300 | Plastic | 1.544 | 55.9 | −2.90 |
| 11 | | 1.489 | ASP | 0.400 | | | | |
| 12 | IR-cut filter | Plano | | 0.200 | Glass | 1.517 | 64.2 | — |
| 13 | | Plano | | 0.100 | | | | |
| 14 | Cover glass | Plano | | 0.300 | Glass | 1.517 | 64.2 | — |
| 15 | | Plano | | 0.092 | | | | |
| 16 | Image | Plano | | — | | | | |

Note:
Reference wavelength (d-line) is 587.6 nm.

TABLE 18

Aspheric Coefficients

| Surface # | 2 | 3 | 4 | 5 | 6 |
|---|---|---|---|---|---|
| k = | −2.0269E+00 | −8.8143E+00 | −3.5088E−01 | −5.0000E+01 | −2.5298+001 |
| A4 = | 1.2796E−01 | −2.0582E−02 | −4.5468E−02 | 3.1824E−02 | −3.0814E−01 |
| A6 = | −7.0773E−02 | 9.2719E−03 | 1.2309E−01 | 1.9760E−01 | −2.1191E−02 |
| A8= | 4.9044E−01 | 1.3829E−01 | 4.0332E−01 | −1.2861E−01 | −1.1802E−01 |
| A10 = | −1.3507E+00 | −6.8472E−01 | −1.6696E+00 | 3.3115E−01 | 1.5526E−01 |
| A12 = | 1.9240E+00 | 1.3746E+00 | 2.6389E+00 | −5.5849E−01 | 6.9099E−02 |
| A14 = | −1.0763E+00 | −1.0400E+00 | −1.6256E+00 | 5.2233E−01 | |

| Surface # | 7 | 8 | 9 | 10 | 11 |
|---|---|---|---|---|---|
| k = | −1.0000E+00 | 5.2436E−01 | −3.6094E+00 | −1.0000E+00 | −4.6345E+00 |
| A4 = | −1.7841E−01 | 1.2519E−01 | −3.7414E−02 | −6.5189E−02 | −7.8836E−02 |
| A6= | −4.6904E−02 | 3.6628E−01 | 1.2236E−01 | −2.0859E−02 | 2.6483E−02 |
| A8 = | −1.6242E−01 | −1.6386E−01 | −7.7227E−02 | 2.4367E−02 | −7.3279E−03 |
| A10 = | 6.1529E−02 | 1.4925E−01 | 2.8565E−02 | −7.2534E−03 | 1.3554E−03 |
| A12 = | 2.1437E−02 | −6.0636E−02 | −7.3171E−03 | 9.5694E−04 | −1.3960E−04 |
| A14 = | | 9.2696E−03 | 8.4639E−04 | −4.9331E−05 | 5.7651E−06 |

In the photographing lens assembly according to the 9th embodiment, the definitions of the following parameters are the same as those stated in the 1st embodiment with corresponding values for the 9th embodiment. Moreover, these parameters can be calculated from Table 17 and Table 18 as the following values and satisfy the following relationships:

| f (mm) | 3.84 | (T34 + T45)/CT3 | 4.558 |
|---|---|---|---|
| Fno | 2.65 | (R1 + R2)/(R1 − R2) | −1.40 |
| HFOV (deg.) | 37.0 | f/R4 | −0.06 |
| V2 + V3 | 46.8 | (\|R1 × R4\| + R2 × R3\|)/R2 × R4\| | 0.23 |
| T45 (mm) | 0.767 | R6/f3 | 1.85 |
| T12/T23 | 0.639 | \|f/R5\| + \|f/R6\| | 0.16 |
| T45/CT4 | 1.519 | (R9 + R10)/(R9 − R10) | 1.11 |
| T45/CT5 | 2.557 | f/f4 | 1.06 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing lens assembly comprising, in order from an object side to an image side:

a first lens element with positive refractive power having an object de surface being convex at a paraxial region thereof;

second lens element with negative refractive power;

a third lens element with refractive power;

a fourth lens element with positive refractive power having an object-side surface being concave at a paraxial region thereof and an image-side surface being convex at a paraxial region thereof; and a fifth lens element with negative refractive power having an image-side surface being concave at a paraxial region thereof and being convex at a peripheral region thereof, wherein the fifth lens element is made of plastic material and has at least one of an object-side surface and the image-side surface being aspheric;

wherein an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, an axial distance between the first lens element and the second lens element is T12, an axial distance between the second lens element and the third lens element is T23, and the following relationships are satisfied:

$1.0 < T45/CT4 < 2.5$;

$1.0 < T45/CT5 < 5.0$;

$-2.0 < f/R4 < 0.40$; and $0 < T12/T23 < 0.65$.

2. The photographing lens assembly of claim 1, wherein an Abbe number of the second lens element is V2, an Abbe number of the third lens element is V3, and the following relationship is satisfied:

$40 < V2 + V3 < 60$.

3. The photographing lens assembly of claim 1, wherein the focal length of the photographing lens assembly is f, a curvature radius of an object-side surface of the third lens element is R5, a curvature radius of an image-side surface of the third lens element is R6, and the following relationship is satisfied:

$0 < |f/R5| + |f/R6| < 1.0$.

4. The photographing lens assembly of claim 1, wherein the axial distance between the fourth lens element and the fifth lens element is T45, and the following relationship is satisfied:

$0.50 \text{ mm} < T45 < 1.2 \text{ mm}$.

5. The photographing lens assembly of claim 4, wherein the object-side surface of the fifth lens element is concave at a paraxial region thereof.

6. The photographing lens assembly of claim 4, wherein a curvature radius of an image-side surface of the third lens element is R6, a focal length of the third lens element is f3, and the following relationship is satisfied:

$0 < R6/f3 < 2.5$.

7. The photographing lens assembly of claim 1, wherein the focal length of the photographing lens assembly is f, a focal length of the fourth lens element is f4, and the following relationship is satisfied:

$0.6 < f/f4 < 1.8$.

8. The photographing lens assembly of claim 7, wherein the focal length of the photographing lens assembly is f, the curvature radius of the image-side surface of the second lens element is R4, and the following relationship is satisfied:

$-0.60 < f/R4 < 0.20$.

9. The photographing lens assembly of claim 8, wherein a curvature radius of the object-side surface of the first lens element is R1, a curvature radius of an image-side surface of the first lens element is R2, and the following relationship is satisfied:

$-2.0 < (R1+R2)/(R1-R2) < -0.80$.

10. The photographing lens assembly of claim 7, wherein the third lens element has negative refractive power.

11. The photographing lens assembly of claim 10, wherein the third lens element has an object-side surface being concave at a paraxial region thereof and an image-side surface being convex at a paraxial region thereof.

12. The photographing lens assembly of claim 10, wherein the axial distance between the fourth lens element and the fifth lens element is T45, the central thickness of the fourth lens element is CT4, and the following relationship is satisfied:

$1.0 < T45/CT4 < 1.6$.

13. The photographing lens assembly of claim 10, wherein a curvature radius of the object-side surface of the first lens element is R1, a curvature radius of an image-side surface of the first lens element is R2, a curvature radius of an object-side surface of the second lens element is R3, the curvature radius of the image-side surface of the second lens element is R4, and the following relationship is satisfied:

$0 < (|R1 \times R4| + |R2 \times R3|)/|R2 \times R4| < 0.5$.

14. A photographing lens assembly comprising, in order from an object side to an image side:

a first lens element with positive refractive power having an object-side surface being convex at a paraxial region thereof;

a second lens element with negative refractive power;
a third lens element with refractive power;
a fourth lens element with positive refractive power having an object-side surface being concave at a paraxial region thereof and an image-side surface being convex at a paraxial region; and
a fifth lens element with negative refractive power having an image-side surface being concave at a paraxial region thereof and being convex at a peripheral region thereof, wherein the fifth lens element is made of plastic material and has at least one of an object-side surface and the image-side surface being aspheric;
wherein an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, a curvature radius of an object-side surface of the third lens element is R5, a curvature radius of an image-side surface of the third lens element is R6, and the following relationships are satisfied:

$1.0 < T45/CT4 < 2.5$, $1.0 < T45/CT5 < 5.0$;

$-2.0 < f/R4 < 0.40$; and $0 < |f/R5| + |f/R6| < 2.0$.

15. The photographing lens assembly of claim 14, wherein a curvature radius of the object-side surface of the first lens element is R1, a curvature radius of an image-side surface of the first lens element is R2, a curvature radius of an object-side surface of the second lens element is R3, the curvature radius of the image-side surface of the second lens element is R4, and the following relationship is satisfied:

$0 < (|R1 \times R4| + |R2 \times R3|)/|R2 \times R4| < 0.75$.

16. The photographing lens assembly of claim 15, wherein the curvature radius of the image-side surface of the third lens element is R6, a focal length of the third lens element is f3, and the following relationship is satisfied:

$0 < R6/f3 < 2.5$.

17. The photographing lens assembly of claim 15, wherein an axial distance between the third lens element and the fourth lens element is T34, the axial distance between the fourth lens element and the fifth lens element is T45, a central thickness of the third lens element is CT3, and the following relationship is satisfied:

$3.3 < (T34+T45)/CT3 < 6.0$.

18. The photographing lens assembly of claim 14, wherein the axial distance between the fourth lens element and the fifth lens element is T45, and the following relationship is satisfied:

$0.50 \text{ mm} < T45 < 1.2 \text{ mm}$.

19. The photographing lens assembly of claim 18, wherein a curvature radius of the object-side surface of the fifth lens element is R9, a curvature radius of the image-side surface of the fifth lens element is R10, and the following relationship is satisfied:

$-0.5 < (R9+R10)/(R9-R10) < 0.5$.

20. The photographing lens assembly of claim 18, wherein an axial distance between the first lens element and the second lens element is T12, an axial distance between the second lens element and the third lens element is T23, and the following relationship is satisfied:

$0 < T12/T23 < 0.65$.

21. A photographing lens assembly comprising, in order from an object side to an image side:
a first lens element with positive refractive power having an object-side surface being convex at a paraxial region thereof;
a second lens element with negative refractive power;
a third lens element with refractive power;
a fourth lens element with positive refractive power having an object-side surface being concave at a paraxial region thereof and an image-side surface being convex at a paraxial region thereof; and
a fifth lens element with negative refractive power having an image-side surface being concave at a paraxial region thereof and being convex at a peripheral region thereof, wherein the fifth lens element is made of plastic material and has at least one of an object-side surface and the image-side surface being aspheric;
wherein an axial distance between the fourth lens element and the fifth lens element is T45, a central thickness of the fourth lens element is CT4, a central thickness of the fifth lens element is CT5, a focal length of the photographing lens assembly is f, a curvature radius of an image-side surface of the second lens element is R4, an axial distance between the third lens element and the fourth lens element is T34, a central thickness of the third lens element is CT3, and the following relationships are satisfied:

$1.1 < T45/CT4 < 2.5$;

$1.0 < T45/CT5 < 5.0$;

$-2.0 < f/R4 < 0.70$; and $3.3 < (T34+T45)/CT3 < 6.0$.

22. The photographing lens assembly of claim 21, wherein the axial distance between the fourth lens element and the fifth lens element is T45, and the following relationship is satisfied:

$0.50 \text{ mm} < T45 < 1.2 \text{ mm}$.

23. The photographing lens assembly of claim 21, wherein a curvature radius of the object-side surface of the first lens element is R1, a curvature radius of an image-side surface of the first lens element is R2, a curvature radius of an object-side surface of the second lens element is R3, the curvature radius of the image-side surface of the second lens element is R4, and the following relationship is satisfied:

$0 < (|R1 \times R4| + |R2 \times R3|)/|R2 \times R4| < 0.75$.

24. The photographing lens assembly of claim 21, wherein an Abbe number of the second lens element is V2, an Abbe number of the third lens element is V3, and the following relationship is satisfied:

$40 < V2+V3 < 60$.

25. The photographing lens assembly of claim 21, wherein the third lens element has negative refractive power, the focal length of the photographing lens assembly is f, a curvature radius of an object-side surface of the third lens element is R5, a curvature radius of an image-side surface of the third lens element is R6, and the following relationship is satisfied:

$0 < |f/R5| + |f/R6| < 2.0$.

26. The photographing lens assembly of claim 25, wherein the object-side surface of the third lens element is concave at a paraxial region thereof and the image-side surface of the third lens element is convex at a paraxial region thereof.

* * * * *

UNITED STATES PATENT AND TRADEMARK OFFICE
CERTIFICATE OF CORRECTION

PATENT NO.         : 8,705,182 B1
APPLICATION NO.    : 13/741366
DATED              : April 22, 2014
INVENTOR(S)        : Chun-Shan Chen and Wei-Yu Chen Page 1 of 1

It is certified that error appears in the above-identified patent and that said Letters Patent is hereby corrected as shown below:

Title Page, Item (73) Assignee, "Largen" should read --Largan--.

In the Specification

Column 31, line 29, "object de" should read --object-side--.

Column 31, line 31, before "second lens element" insert --a--.

Signed and Sealed this
Thirtieth Day of September, 2014

Michelle K. Lee
*Deputy Director of the United States Patent and Trademark Office*